United States Patent
Yang et al.

(10) Patent No.: US 11,514,872 B2
(45) Date of Patent: Nov. 29, 2022

(54) MITIGATING DISPLAY INTERFERENCE WITH CAPTURED IMAGE BY CONTROLLING DISPLAY BRIGHTNESS

(71) Applicant: Motorola Mobility LLC, Chicago, IL (US)

(72) Inventors: Jie Yang, Suizhou (CN); John Christopher Pincenti, Chicago, IL (US); Thomas Yates Merrell, St Charles, IL (US)

(73) Assignee: Motorola Mobility LLC, Chicago, IL (US)

( * ) Notice: Subject to any disclaimer, the term of this patent is extended or adjusted under 35 U.S.C. 154(b) by 26 days.

(21) Appl. No.: 17/163,940

(22) Filed: Feb. 1, 2021

(65) Prior Publication Data
US 2022/0208142 A1 Jun. 30, 2022

(30) Foreign Application Priority Data
Dec. 29, 2020 (CN) .......................... 202011603860.6

(51) Int. Cl.
*G09G 5/10* (2006.01)
*H04N 5/235* (2006.01)
*H04N 5/232* (2006.01)

(52) U.S. Cl.
CPC ............. *G09G 5/10* (2013.01); *H04N 5/2354* (2013.01); *H04N 5/23293* (2013.01);
(Continued)

(58) Field of Classification Search
CPC ............. G09G 5/10; G09G 2320/0686; G09G 2360/141; G09G 2360/144; H04N 5/23293; H04N 5/2354; H04N 5/2257
See application file for complete search history.

(56) References Cited

U.S. PATENT DOCUMENTS 11,095,762 B2 * 8/2021 Onyekwelu ......... H04M 1/0264
2015/0199554 A1 7/2015 Merrell et al.
(Continued)

FOREIGN PATENT DOCUMENTS

CN 111489694 8/2020

OTHER PUBLICATIONS

"Check that flicker detection is enabled", Cannon Support Website, Article Id: ART168687, Canon U.S.A., Inc. [retrieved Feb. 18, 2021]. Retrieved from the internet <https://support.usa.canon.com/kb/index?page=content&id=ART168687>., Oct. 31, 2017, 5 pages.
(Continued)

*Primary Examiner* — Rodney Amadiz
(74) *Attorney, Agent, or Firm* — FIG. 1 Patents

(57) ABSTRACT

A device includes a digital camera positioned underneath a display of the device that captures images through the display. The brightness of the display is controlled when capturing images using the digital camera to reduce interference from light emitted by the display with the captured images. The brightness can be controlled in various manners, such as reducing the brightness of only a camera region of the display that is within the field of view of the camera, reducing the brightness of only an expanded region of the display that includes a camera region of the display and an area surrounding the camera region but less than the entire display, reducing the brightness of the entire display or the brightness of only particular colors of the display, blacking out the camera region of the display, blacking out the expanded region of the display, strobing the display, and so forth.

20 Claims, 18 Drawing Sheets

(52) U.S. Cl.
CPC ............ *G09G 2320/0686* (2013.01); *G09G 2360/141* (2013.01); *G09G 2360/144* (2013.01)

(56) References Cited

U.S. PATENT DOCUMENTS

| | | | |
|---|---|---|---|
| 2015/0271392 A1* | 9/2015 | Musgrave | G09G 3/3406 348/207.11 |
| 2016/0121006 A1 | 5/2016 | Wu | |
| 2016/0337570 A1* | 11/2016 | Tan | G06F 3/005 |
| 2017/0116932 A1* | 4/2017 | Musgrave | H04N 5/2351 |
| 2019/0158713 A1* | 5/2019 | Mcmillan | H01L 27/3234 |
| 2020/0143135 A1 | 5/2020 | Kim | |
| 2020/0387688 A1 | 12/2020 | Park et al. | |
| 2020/0401781 A1* | 12/2020 | Haddad | G06V 40/1359 |
| 2021/0042496 A1 | 2/2021 | Choe | |
| 2021/0065606 A1* | 3/2021 | Park | G09G 3/20 |
| 2021/0150176 A1 | 5/2021 | Song et al. | |
| 2021/0304663 A1* | 9/2021 | Kim | G09G 3/32 |
| 2022/0207674 A1 | 6/2022 | Pincenti et al. | |
| 2022/0207675 A1 | 6/2022 | Merrell et al. | |

OTHER PUBLICATIONS

Kaye, Grant, "Dark Frame Subtraction", Grant Kaye Creative, LLC Blog [retrived Feb. 18, 2021]. Retrieved from the Internet <https://www.grantkaye.com/blog/2016/2/1/dark-frame-subtraction>., May 3, 2016, 5 pages.

Young, Ian T. , "Shading Correction: Compensation for Illumination and Sensor Inhomogeneities", Current Protocols in Cytometry, vol. 14, Issue 1 [retrieved Feb. 18, 2021]. Retrieved from the Internet, <https://www.researchgate.net/profile/Ian_Young3/publication/23236852_Shading_Correction_Compensation_for_Illumination_and_Sensor_Inhomogeneities/links/5a17fb994585155c26a7bbab/Shading-Correction-Compensation-for-Illumination-and-Sensor-Inhomogeneities.pdf, May 1, 2001, 14 pages.

U.S. Appl. No. 17/163,873, "Non-Final Office Action", U.S. Appl. No. 17/163,873, dated Sep. 2, 2022, 17 pages.

U.S. Appl. No. 17/163,971, "Non-Final Office Action", U.S. Appl. No. 17/163,971, dated Sep. 23, 2022, 16 pages.

\* cited by examiner

MITIGATING DISPLAY INTERFERENCE WITH CAPTURED IMAGE BY CONTROLLING DISPLAY BRIGHTNESS

BACKGROUND

Modern devices provide an array of image capture technologies, such as via implementation of cameras for capturing digital images, digital video, and so forth. For instance, mobile devices such as mobile phones, tablets, and so forth, typically include camera functionality for capturing images from a variety of angles, including front facing and rear facing cameras. However, the push toward maximizing screen area of device displays presents challenges in camera placement for front facing cameras.

BRIEF DESCRIPTION OF THE DRAWINGS

Implementations of the techniques for mitigating display interference with captured image by controlling display brightness are described with reference to the following Figures. The same numbers may be used throughout to reference like features and components shown in the Figures.

DETAILED DESCRIPTION

Figure 1:
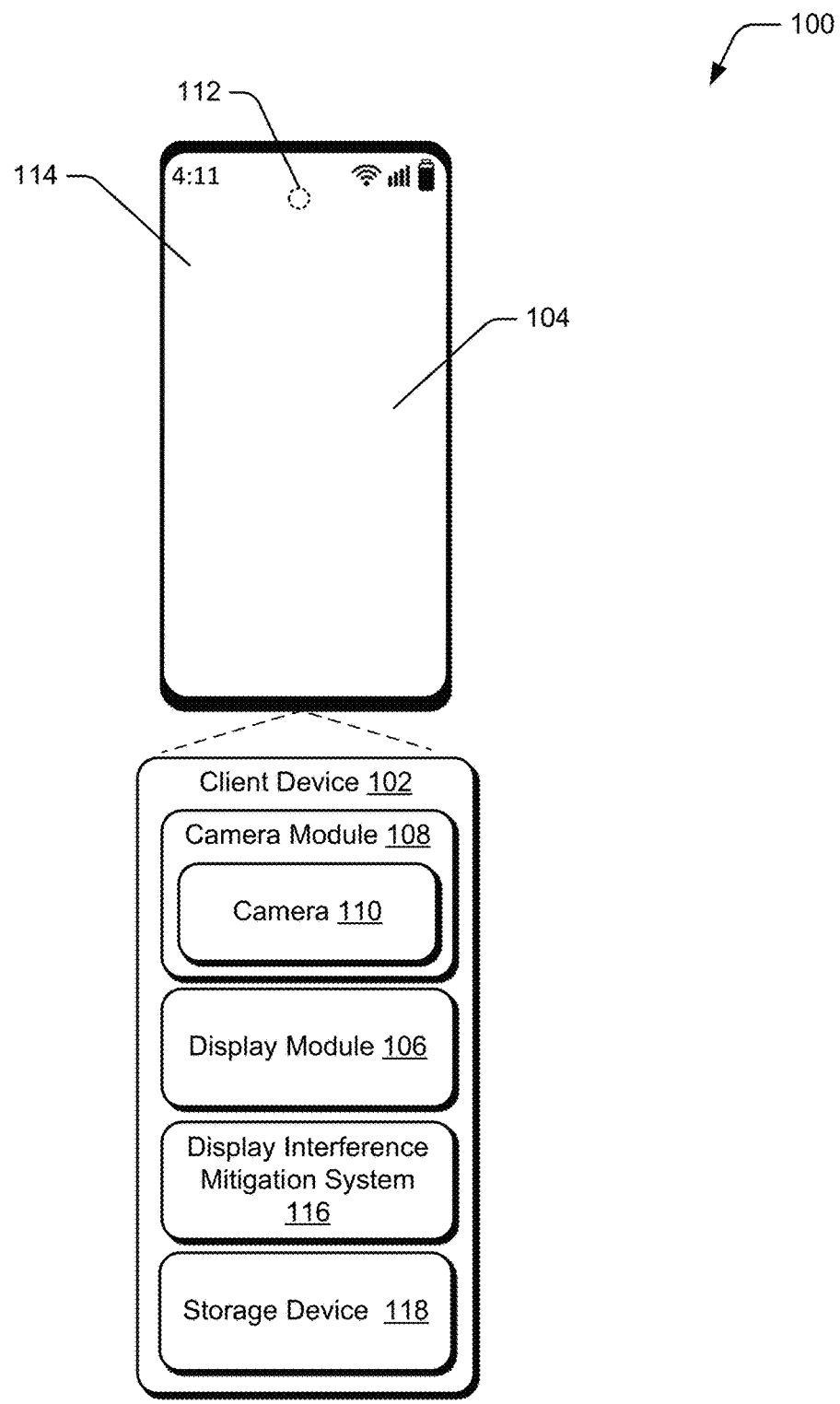
FIG. 1 illustrates an example environment implementing the techniques discussed herein.

Mitigating display interference with captured image by controlling display brightness is discussed herein. Generally, the techniques discussed herein are directed to devices in which a digital camera is positioned underneath a display of the device and captures images through the display. Such a positioning of the digital camera allows for enhanced display space as compared to conventional devices that typically reduce display size to accommodate camera positions adjacent a display. Placing the digital camera underneath the display, however, presents a number of implementation challenges. For example, when capturing images using a digital camera positioned underneath the display, light emitted by the display can get into the digital camera, interfering with or corrupting the captured images. The techniques discussed herein reduce or mitigate interference by light emitted from the display of a device when capturing images using a camera positioned underneath the display.

One technique for mitigating interference by light from the display of a device when capturing images using a camera positioned underneath the display is based on calibration images. Generally, a calibration image is captured by the digital camera (referred to as a captured calibration image) while the display is displaying a calibration image of a specific color. In one or more implementations, a different calibration image is displayed and captured for each pixel type (e.g., red, green, and blue) included in the display. The sensor gain and integration time for each of these captured calibration images is recorded or known. When an additional image is subsequently captured (e.g., the user taking a selfie or using face recognition to authenticate themselves), a capture parameter ratio is determined based on the sensor gain and integration times for the captured calibration images and the sensor gain and integration time for the additional captured image. For each pixel type, an amount of color emitted by the pixels on the display (e.g., within the field of view of the digital camera) for a currently displayed image is determined. In one or more implementations, a subtraction image for each pixel type is generated by determining a multiplier that is the multiplication product of the capture parameter ratio for the pixel type and the amount of color emitted on the display for the pixel type for the displayed image, and multiplying the corresponding calibration image by the multiplier. The subtraction images are subtracted from the additional captured image, resulting in an enhanced output image that compensates for the light emitted by the display while the additional captured image is captured.

Additionally or alternatively, for each pixel type the capture parameter ratio is determined and a color channel for the pixel type is generated. A subtraction image is generated for each pixel type by multiplying the corresponding calibration image by the capture parameter ratio and, on a per-pixel bases, the color channel. The subtraction images are subtracted from the additional captured image, resulting in an enhanced output image that compensates for the light emitted by the display while the additional image is captured.

The use of such captured calibration images to generate an enhanced output image mitigates interference from light emitted by the display, improving operation of the client device by providing a more accurate image of the scene external to the client device, such as allowing user authentication using a face or fingerprint captured by the camera through the display to be more accurately performed.

Another technique for reducing interference by light from the display of a device when capturing images using a camera positioned underneath the display is based on recalibration images. Recalibration images are captured in the same manner as captured calibration images but captured at a later time. For example, the original captured calibration images may be captured at a factory or user's home, and the captured recalibration images may be captured days, months, or years after the original captured calibration images were captured. In one or more implementations, a different recalibration image is displayed and captured for each pixel type (e.g., red, green, and blue) included in the display. The captured recalibration image is merged with the previously captured calibration image to generate a merged calibration image, which is afterwards used as the captured calibration image. For example, after the merged calibration image is generated the merged calibration image becomes the new captured calibration image for the client device, so subtraction images are generated based on the merged calibration image rather than the previously captured calibration image.

Recalibration images may be captured in response to any of a variety of different trigger events that may cause or indicate a change in the alignment and geometries of the display pixels to the imager pixels, such as the client device being bumped or dropped, a temperature of the client device exceeding a threshold amount, user authentication using an image captured by the digital camera failing, and so forth. Various additional criteria may also be used in determining a timing of when to capture the recalibration images in response to a trigger event, such as the client device being in a low light environment, no objects being near the front of the display, the client device facing approximately up, the client device being stationary, the client device charging (e.g., plugged into a charging cable), and so forth.

The merged calibration image is generated in any of a variety of different manners, such as replacing the previously captured calibration image with the captured recalibration image, blending (e.g., averaging or using another combination ratio) corresponding pixel values from the previously captured calibration image and the captured recalibration image, and so forth.

The generation of such captured recalibration images allows the client device to adapt to changes in the alignment and geometries of the display pixels to the imager pixels over time or in response to various events (e.g., dropping the client device). This allows enhanced output images that mitigate interference from lighted emitted by the display to continue to be generated despite changes to the alignment and geometries of the display pixels to the imager pixels.

Another technique for reducing interference by light from the display of a device when capturing images using a camera positioned underneath the display is controlling the brightness of the display while the images are being captured. For example, the brightness of only a portion of the display that is within the field of view of the camera can be reduced or the brightness of only an expanded region of the display can be reduced, with the expanded region including a camera region of the display that is within the field of view of the camera and an area surrounding the camera region but less than the entire display. By way of another example, the brightness of the entire display can be reduced or the brightness of only particular colors of the display can be reduced (e.g., the brightness of red display pixels may be reduced but the brightness of green and blue pixels may not be reduced). By way of another example, a camera region of the display that is within the field of view of the camera may be blacked out, or an expanded region that includes the camera region and an area surrounding the camera region but less than the entire display may be blacked out. The display is optionally strobed while an imager of the camera is active, reducing the brightness of the display or blacking out a portion of the display while the imager is capturing an image but not reducing the brightness of the display and not blacking out a portion of the display while the imager is not capturing an image.

In one or more embodiments the manner in which brightness of the display is controlled varies based on an ambient light level measurement from a light sensor of the client device (e.g., a dedicated ambient light sensor or an imager of the camera). As an example, for low light situations (e.g., less than 50 lux) a portion of the display including the camera region is blacked out, for medium level light situations (e.g., between 50 lux and 1000 lux) the brightness of the display (e.g., the camera region or the entire display) is reduced, for medium to high level light situations (e.g., between 1000 lux and 50,000 lux) the display is strobed, and for high light situations (e.g., more than 50,000 lux) no action is taken to mitigate interference from the light emitted from the display 104.

Controlling the brightness of the display mitigates interference from light emitted by the display, improving operation of the client device by providing a more accurate image of the scene external to the client device, such as allowing user authentication using a face or fingerprint captured by the camera through the display to be more accurately performed.

While features and concepts of mitigating display interference with captured image by controlling display brightness can be implemented in any number of different devices, systems, environments, and/or configurations, implementations of mitigating display interference with captured image by controlling display brightness are described in the context of the following example devices, systems, and method.

FIG. 1 illustrates an example environment 100 implementing the techniques discussed herein. The environment 100 includes a client device 102 that can be, or include, many different types of computing or electronic devices. For example, the computing device 102 can be a smartphone or other wireless phone, a camera (e.g., compact or single-lens reflex), or a tablet or phablet computer. By way of further example, the computing device 102 can be a notebook computer (e.g., netbook or ultrabook), a laptop computer, a wearable device (e.g., a smartwatch, a fitness tracker), a personal media player, a personal navigating device (e.g., global positioning system), an entertainment device (e.g., a gaming console, a portable gaming device, a streaming media player, a digital video recorder, a music or other audio playback device), a video camera, an Internet of Things (IoT) device, an automotive computer, and so forth. Further example attributes of the client device 102 are discussed below with reference to the device 2000 of FIG. 20.

The client device 102 includes functionality for visual output, including a display (also referred to as a display screen) 104 that is operable via a display module 106. Generally, the display 104 can be implemented via a variety of different display technologies, such as light-emitting diode (LED), liquid-crystal display (LCD), organic light-emitting diode (OLED), and so forth. The display 104 can be activated and deactivated. When deactivated the display 104 is blank and not illuminated, emitting little or no light. When activated, the display 104 is illuminated and emits light to display any of various graphics, texts, and so forth. In one or more embodiments, the display 104 can be activated and deactivated selectively, allowing individual pixels or groups of pixels to be activated and deactivated. Accordingly, at any given time some pixels of the display 104 may be activated while other pixels of the display 104 are deactivated.

Further, the display module 106 represents functionality for managing functionality of the display 104, such as output provided by and input received by the display 104, activating and deactivating the display 104, and so forth. The display module 106 includes, for example, hardware and logic for driving functionality of the display 104.

The client device 102 also includes functionality for enabling image capture, including a camera module 108 that implements a digital camera 110. Generally, the camera 110 represents hardware for capturing images, such as still images, video, and so forth. The camera 110, for instance, includes hardware such as an optical lens or set of lenses, a light sensor, a flash, an aperture, an imager, and so forth. Further, the camera module 108 includes hardware and/or logic for managing image capture via the camera 110. The camera 110 can capture images digitally using an imager implemented in any of a variety of different technologies, such as a charge-coupled device (CCD) sensor, a complementary metal-oxide-semiconductor (CMOS) sensor, combinations thereof, and so forth.

The camera 110 can be activated and deactivated. When deactivated the camera 110 is in a low power mode, consuming little or no power. When activated, the camera 110 is in a higher power mode and able to capture images. Although able to capture images, it should be noted that the imager in the camera 110 need not be constantly capturing images. For example, the imager may be capturing images at a rate of 30 frames (images) per second and an integration time (exposure time) of 15 milliseconds (ms), resulting in the imager alternately spending 15 ms capturing an image and 18.33 ms before beginning capturing of a next image.

Generally, the camera 110 is positioned at a camera region 112 of the display 104. The camera region 112 represents, for example, a subregion of the display 104, and the camera 110 is positioned beneath the display 104 at the camera region 112. For example, the camera 110 is positioned beneath a surface of the display 104 and beneath the camera region 112, an example of which is depicted below in FIG. 2. The camera region 112 is illustrated here using a dashed circle for purposes of example only (i.e., the dashed circle is not displayed in operation), and it is to be appreciated that typically the camera region 112 is not readily visually distinguishable from other regions of the display 104. In one or more implementations, the camera region 112 corresponds to the field of view of the camera 110. Other portions of the display 104, other than the camera region 112, are referred to as peripheral regions 114.

The client device 102 also includes a display interference mitigation system 116. The display interference mitigation system 116 implements one or more of various techniques to reduce interference by light from the display 104 when the camera 110 is capturing images. One example of these techniques is capturing calibration images and using the calibration images to generate subtraction images, then subtracting these subtraction images from subsequently captured images. Another example of these techniques is capturing recalibration images in certain situations, such as in situations when the client device 102 is in a low light environment and after the client device 102 has been dropped or jarred. These recalibration images can be blended with or replace the previously captured calibration images. Another example of these techniques is altering the display 104, such as reducing the brightness of the display, blacking out the camera region 112, expanding the camera region 112, and so forth.

The display interference mitigation system 116 can be implemented in a variety of different manners. For example, the display interference mitigation system 116 can be implemented as multiple instructions stored on computer-readable storage media and that can be executed by a processing system. Additionally or alternatively, the display interference mitigation system 116 can be implemented at least in part in hardware (e.g., as an application-specific integrated circuit (ASIC), a field-programmable gate array (FPGA), an application-specific standard product (ASSP), a system-on-a-chip (SoC), a complex programmable logic device (CPLD), and so forth).

Although illustrated as a separate system in FIG. 1, additionally or alternatively the display interference mitigation system 116 can be implemented as part of another system or module. For example, the display interference mitigation system 116 can be implemented as part of the display module 106.

Various images captured by the camera 110, including calibration and recalibration images discussed in more detail below, are stored in a storage device 118. The storage device 118 represents a digital storage medium that can be implemented using any of a variety of storage technologies, such as Flash or other solid state memory, magnetic disk, optical disc, and so forth. The storage device 118 can also store various program instructions and data for the camera module 108 or the display interference mitigation system 116.

Figure 2:
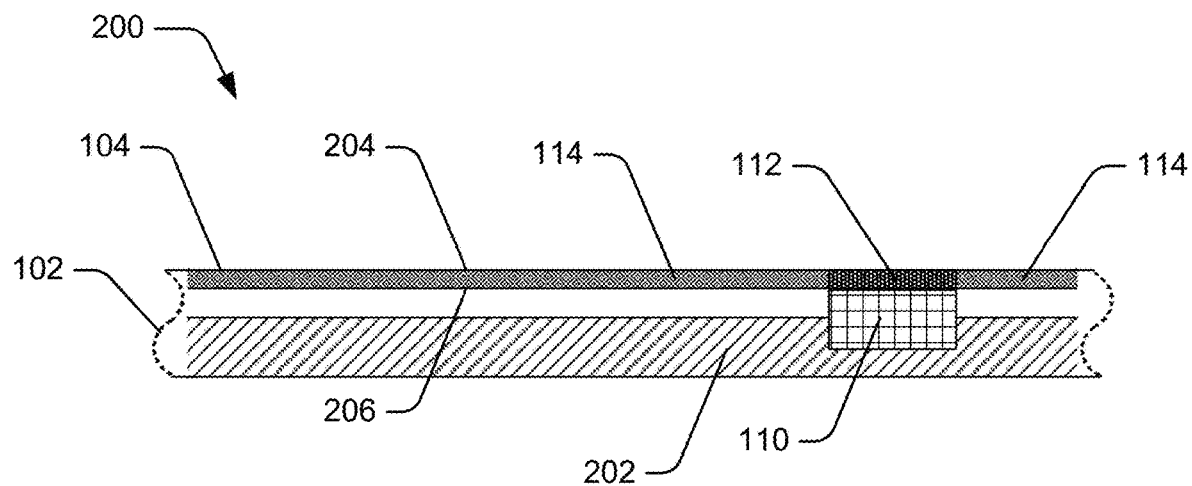
FIG. 2 depicts a partial cross section view of a client device in accordance with one or more implementations.

FIG. 2 depicts a partial cross section view 200 of the client device 102 in accordance with one or more implementations. The cross section view 200 illustrates the display 104 including the camera region 112 and peripheral regions 114, along with the camera 110 affixed to an internal structure 202 of the client device 102. The internal structure 202, for instance, represents a printed circuit board (PCB) to which various components of the client device 102 are attached, including the camera 110. As illustrated, the camera 110 is positioned directly beneath the camera region 112 of the display 104. Generally, as part of capturing images by the camera 110, light that is captured at the camera 110 is transmitted through the camera region 112 and typically includes light emitted by the display 104. Further, the camera 110 may also transmit light through the camera region 112, such as for providing flash illumination as part of image capture.

Various objects (not shown) are optionally situated in front of the display 104 at various times. Examples of such objects include a user's face, a user's fingerprint, various household or office objects (e.g., phone, lamp, television, fan), various objects in a purse or briefcase, and so forth. The front of the display 104 refers to the portion of the display opposite the camera 110, illustrated as display front 204. Opposite the front of the display 104 is a back of the display 104, illustrated as display back 206.

The camera region 112 is typically circular, as illustrated in FIG. 1, corresponding to the field of view of the camera 110 through the camera lens. It should be noted that although the camera region 112 is circular the light passing through the camera region 112 and the camera lens is focused on the imager, which is typically rectangular.

Figure 3:
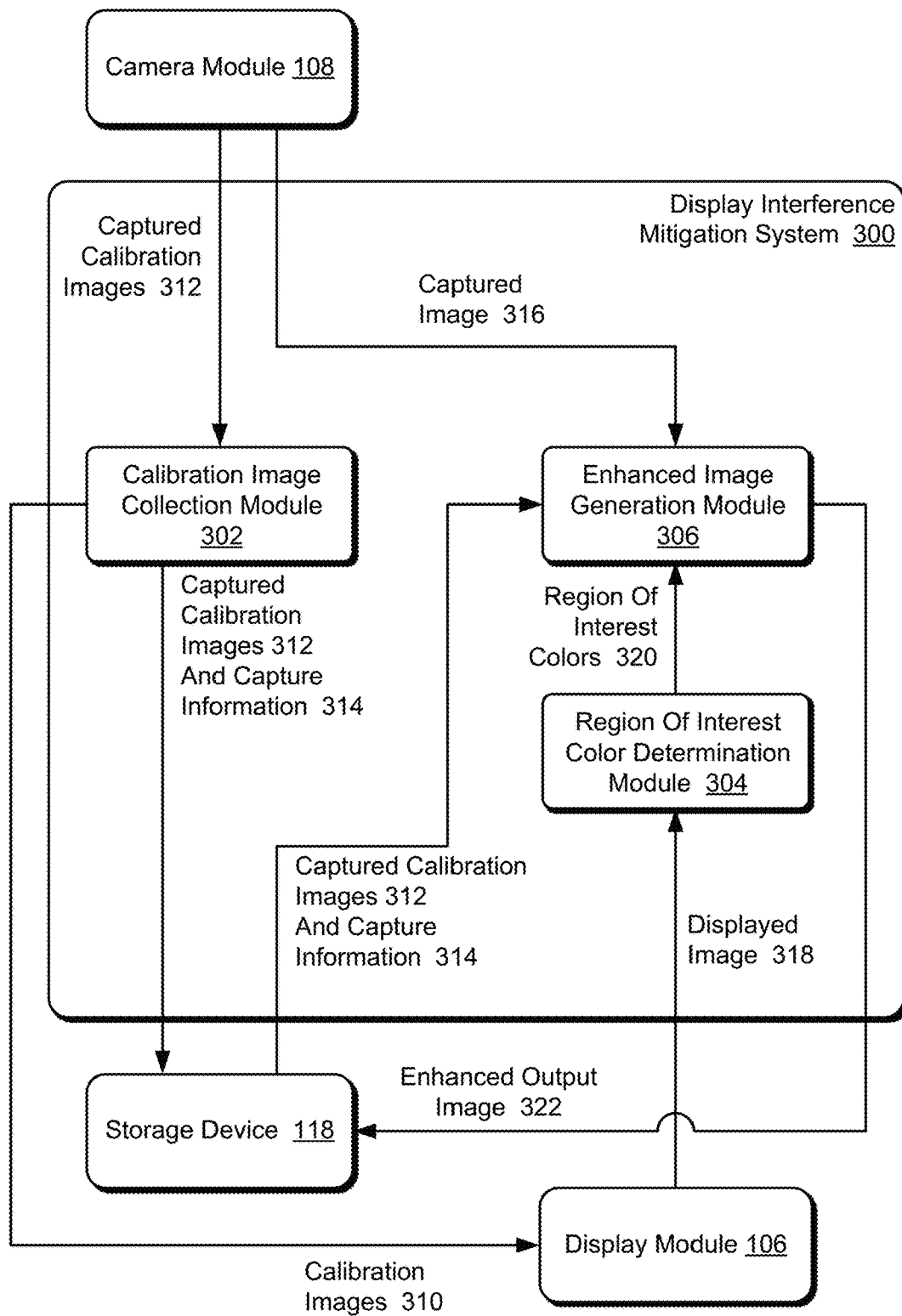
FIG. 3 illustrates an example display interference mitigation system implementing the techniques discussed herein.

FIG. 3 illustrates an example display interference mitigation system 300 implementing the techniques discussed herein. The display interference mitigation system 300 is an example of the display interference mitigation system 116 of FIG. 1. The display interference mitigation system 300 includes a calibration image collection module 302, a region of interest color determination module 304, and an enhanced image generation module 306. Generally, the calibration image collection module 302 collects and stores captured calibration images on the storage device 118. For subsequently captured images, the region of interest color determination module 304 determines the colors in a region of interest (e.g., the camera region 112) for an image displayed on the display 104. The enhanced image generation module 306 generates subtraction images based on the captured calibration images and the colors in the region of interest, and generates an enhanced output image 308 by subtracting the subtraction images from the captured calibration images.

More specifically, the calibration image collection module 302 collects calibration images by generating calibration images 310 and communicating the calibration images 310 to the display module 106. In one or more implementations, one calibration image 310 is generated for each type of display pixel in the display 104. For example, for an RGB display, the calibration image collection module 302 generates and provides to the display module 106 a red calibration image, a green calibration image, and a blue calibration image. Additionally or alternatively, other types of calibration images may be generated and provided to the display module 106, such as a white calibration image if the display includes white pixels, a yellow calibration image if the display includes yellow pixels, and so forth.

In one or more implementations, each calibration image 310 has the values of the associated color set high (e.g., set to a maximum value) and the values of the other colors set low (e.g., set to a minimum value). As an example, using the RGB color space (R, G, B), the red calibration image may have all pixels of (255, 0, 0), the green calibration image may have all pixels of (0, 255, 0), and the blue calibration image may have all pixels of (0, 0, 255). In one or more embodiments, each calibration image 310 has the values of the associated color set high and the values of the other colors set low for the entire display 104. Additionally or alternatively, each calibration image 310 has the values of the associated color set high and the values of the other colors set low for only a portion of the display 104, such as the camera region 112 or an expanded region that includes the camera region 112 and an expanded area around the camera region 112 (e.g., from the center of the camera region 112 the radius of the expanded region may be 10% or 20% larger than the radius of the camera region 112).

Additionally or alternatively, rather than generating calibration images for display by the display module 106, the calibration image collection module 302 can provide an indication to the display module 106 to activate only particular pixels of the display 104 (e.g., only red pixels for the red calibration image). These particular pixels can be, for example, the pixels in the camera region 112, the pixels in an expanded region that includes the camera region and an expanded area around the camera region 112, and so forth. Activating only particular pixels of the display 104 allows energy to be conserved when collecting calibration images because areas outside of the camera region 112 (or outside the camera region 112 by at least a threshold amount, such as 10% or 20%) need not be activated.

The display module 106 displays the calibration images 310. If the display is not already activated then the display module 106 activates display 104 (e.g., wakes the display 104 from a low power mode) in response to receipt of the calibration images 310. The calibration images 310 displayed by the display module 106 are captured by the camera 110 and the camera module 108 provides the captured calibration images 312 to the calibration image collection module 302. The calibration images are captured individually. Accordingly, if a red calibration image, a green calibration image, and a blue calibration image are displayed, then captured calibration images 312 include a red captured calibration image, a green captured calibration image, and a blue captured calibration image. The calibration images are captured by the camera module 108, for example, in response to a calibration image capture signal sent by the calibration image collection module 302 to the camera module 108 while each calibration image 310 is displayed.

The calibration image collection module 302 stores the captured calibration images 312 and capture information 314 in the storage device 118. The capture information 314 includes, for example, the sensor gain and integration time (e.g., exposure time) for each of the captured calibration images 312. Additionally or alternatively, the capture information 314 may be otherwise known to the display interference mitigation system 300 in which case the capture information 314 need not be stored in the storage device 118. For example, the calibration image collection module 302 may be configured to use a known or static sensor gain and integration time, in which case the sensor gain and integration time for the captured calibration images 312 need not be stored in the storage device 118.

In one or more implementations, the calibration images 310 are displayed and captured by the camera module 108 while the client device 102 is in a low light environment. A low light environment refers to an environment where the ambient light level is less than a threshold amount, such as 1 lux. The ambient light level can be obtained from various sensors, such as an ambient light sensor, the imager of the camera 110 (e.g., exposure information in the camera 110), and so forth. Generally, lower amounts of light in the environment result in the captured calibration images 312 more accurately including only the light generated by the display 104 rather than additional light from other sources. This allows the amount of light introduced into a captured image by the display 104 to be subtracted out, as discussed in more detail below. This display and capture of the calibration images can be performed at various times, such as in a factory building the client device 102 prior to delivery to a user, as part of an initialization process by a user after purchasing the client device 102, and so forth.

In one or more implementations, the display interference mitigation system 300 of each client device 102 captures calibration images. Additionally or alternatively, different types or models of client devices 102, or different types or models of displays 104, may operate similarly and thus the calibration images may be displayed and captured for a subset of the types or models of client devices 102 or displays 104 (e.g., a single client device or a single display). The captured calibration images 312 and capture information 314 can then be stored and provided to other client devices 102 of the same model or type (or having the same display 104 model or type) rather than having each individual client device 102 display and capture the calibration images.

After receiving the captured calibration images 312 the camera module 108 obtains a captured image 316 from the digital camera 110. The camera module 108 obtains the captured image 316 in response to any of a variety of events, such as a user input requesting an image be captured, a user requesting authentication (e.g., facial or iris recognition), an object being detected in close proximity to the display 104, a request from another device or system, and so forth.

The display module 106 provides to the region of interest color determination module 104 a displayed image 318, which is the image being displayed on the display 104 at the time that the captured image 316 is captured. The region of interest color determination module 304 determines the colors in a region of interest of the display 104. This region of interest is, for example, the portion of the display 104 within the field of view of the digital camera 110 (the camera region 112). The colors in the region of interest of the display 104 refer to the colors in the displayed image 318 within the region of interest, also referred to as the region of interest of the displayed image 318.

Figure 4:
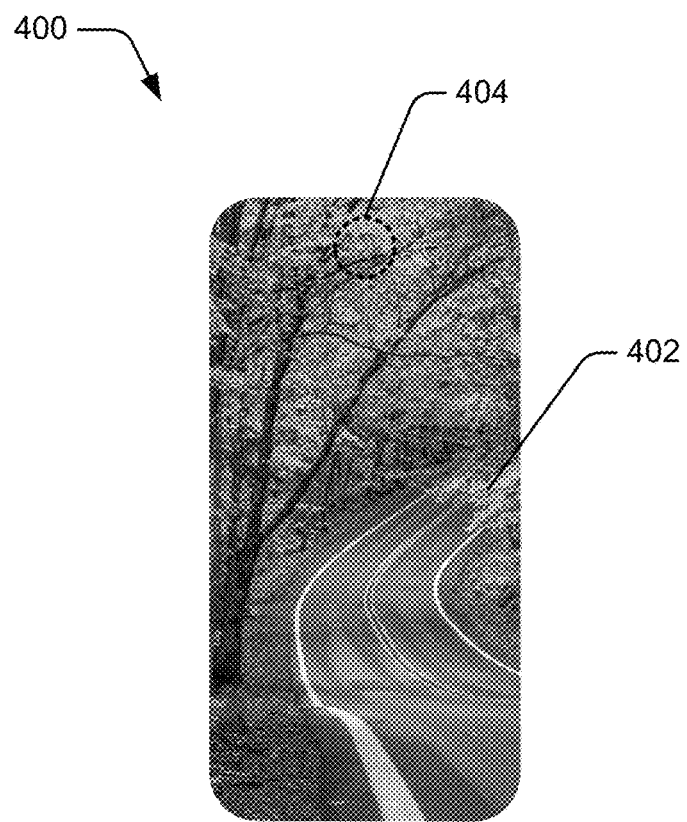
FIG. 4 illustrates an example client device.

FIG. 4 illustrates an example client device 400. The client device 400 includes a display 402 displaying an image (e.g., an autumn scene as illustrated). A camera region 404 is illustrated, showing a predominately yellow/orange color for the displayed image in the camera region 404. It should be noted that although the camera region 404 is illustrated with a circle, that circle need not be (and typically is not) displayed on the display 402.

The displayed image illustrated in FIG. 4 is displayed while the capture image 316 is captured. Thus, concurrently with emitting light to display the displayed image, the digital camera 110 is capturing the captured image 316. Accordingly, some of the light emitted by the display 402, at least within the camera region 404, is captured by the digital camera 110 when capturing the captured image 316.

Returning to FIG. 3, the region of interest color determination module 304 determines the colors in the region of interest of the displayed image 318 and provides an indication of such to the enhanced image generation module 306 as the region of interest colors 320. In one or more implementations, the region of interest color determination module 304 determines the region of interest colors 320 by determining, for the color associated with each calibration image 310, an amount of that color that is included in the region of interest of the displayed image 318. For example, if the calibration images 310 include a red calibration image, a green calibration image, and a blue calibration image, then the region of interest color determination module 304 determines the amount of red in the region of interest of the displayed image 318, the amount of green in the region of interest of the displayed image 318, and an amount of blue in the region of interest of the displayed image 318.

In one or more implementations, the region of interest color determination module 304 determines the amount of a color in the region of interest of the displayed image 318 by combining the pixel values for that color in the region of interest of the displayed image 318. The pixel values can be combined in various different manners, such as by averaging the pixel values in the region of interest. For example, the amount of red in the region of interest is determined by averaging the red values of the pixels in the region of interest of the displayed image 318.

The enhanced image generation module 306 receives the region of interest colors 320 and the captured image 316, and generates an enhanced output image 322 by generating, for the color associated with each calibration image 310, a subtraction image. These subtraction images are generated based on the calibration images 310, the capture information 314, and the region of interest colors 320, and are subtracted from the captured image 316 as discussed in more detail below. In one or more implementations, the enhanced output image 322 is stored in the storage device 118. Additionally or alternatively, the enhanced output image 322 is provided to the display module 106 for display, is provided to another module or system for communication to another device, and so forth.

Figure 5:
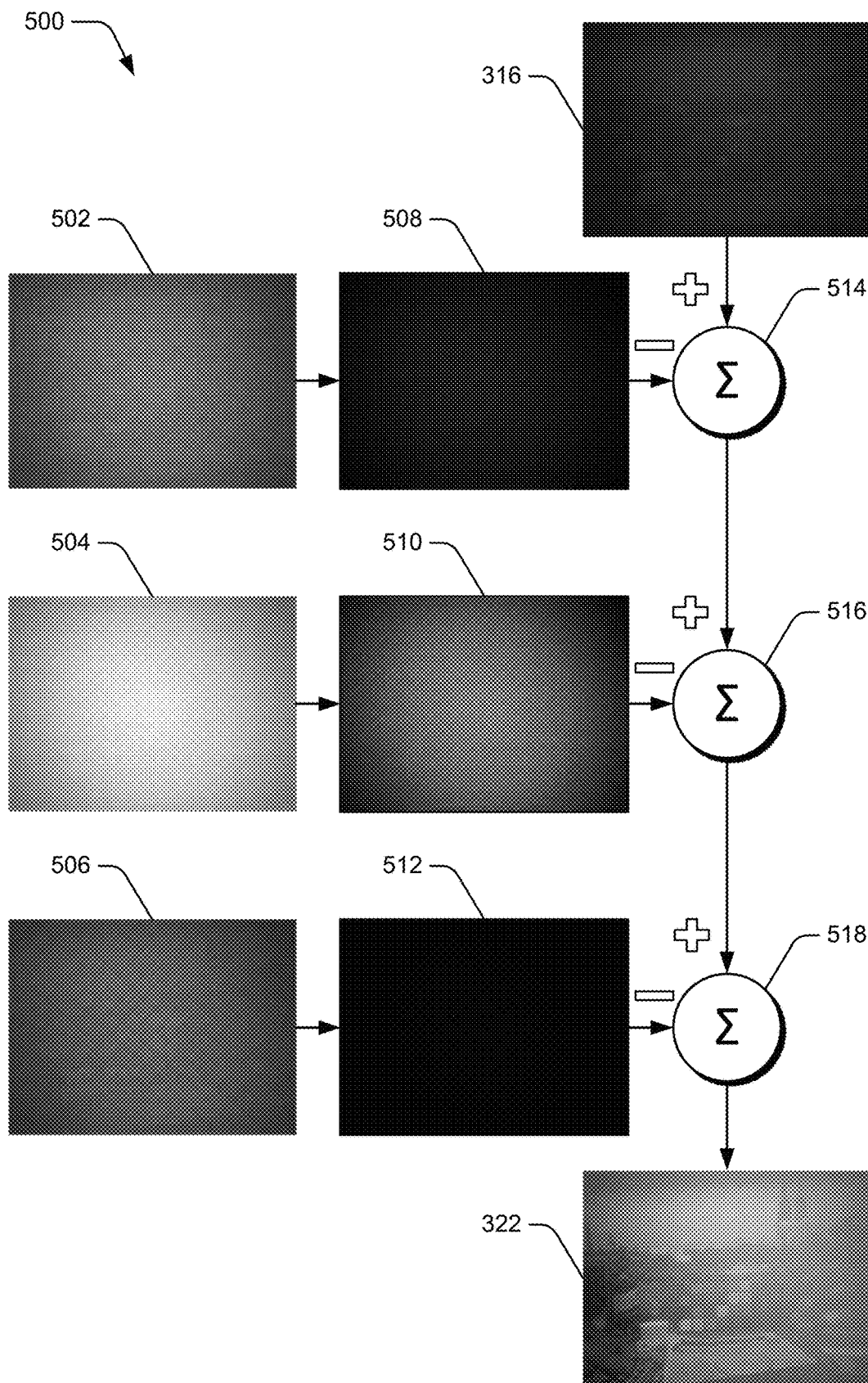
FIG. 5 illustrates an example of generating an enhanced output image.

FIG. 5 illustrates an example 500 of generating an enhanced output image. Illustrated in the example 500 are a red captured calibration image 502, a green captured calibration image 504, and a blue captured calibration image 506. For each captured calibration image 502, 504, and 506, the enhanced image generation module 306 generates a subtraction image 508, 510, and 512, respectively based on a corresponding multiplier. The multipliers for each color are generated based on a capture parameter ratio and an amount of the corresponding color in the region of interest of the displayed image 318. The capture parameter ratio accounts for differences in gain and integration time between the captured calibration images 312 and the captured image 316. In one or more implementations, the multiplier for a color C (Multiplier$_C$) is generated as:

$$Multiplier_C = \frac{Captured\_Gain * Captured\_It}{Calibration\_Gain_C * Calibration\_IT_C} * Color\_Amount_C$$

where Captured_Gain refers to the gain of the captured image 316, Captured_It refers to the integration time of the captured image 316, Calibration_Gain$_C$ refers to the gain of the captured calibration image 312 corresponding to color C, Calibration_IT$_C$ refers to the integration time of the captured calibration image 312 corresponding to color C, and Color_Amount$_C$ refers to the amount of color in the region of interest of the displayed image 318 corresponding to color C. In generating the Multiplier$_C$, the capture parameter ratio is:

$$\frac{Captured\_Gain * Captured\_It}{Calibration\_Gain_C * Calibration\_IT_C}$$

For each color, each corresponding captured calibration image 502, 504, and 506 is multiplied by the corresponding multiplier to generate the corresponding subtraction image 508, 510, and 512. This multiplication refers to multiplying the pixel value for each pixel in the captured calibration image 502, 504, and 506 by the corresponding multiplier. The resultant subtraction images 508, 510, and 512 are subtracted 514, 516, and 518 from the captured image 316, resulting in enhanced output image 322.

In the illustrated example, the subtraction refers to, for subtraction image 508, subtracting 514 the pixel value for each pixel in the subtraction image 508 from the corresponding pixel in the captured image 316. For subtraction image 510, the pixel value for each pixel in the subtraction image 510 is subtracted 516 from the result of the subtracting 514. For subtraction image 512, the pixel value for each pixel in the subtraction image 512 is subtracted 518 from the result of the subtracting 514, resulting in enhanced output image 322.

As illustrated in example 500, the enhanced image generation module 306 subtracts from the calibration image, for each color, a subtraction image corresponding to the light in that color emitted by the display 104 when displaying the displayed image 318. Accordingly, the enhanced output image 322 mitigates interference introduced by the display 104 when displaying the displayed image 318.

Returning to FIG. 3, the region of interest color determination module 304 can determine the amount of a color in the region of interest of the displayed image 318 in various manners other than averaging pixel values in the region of interest. In one or more implementations, the region of interest color determination module 304 uses a machine learning system trained to determine the amount of colors in the region of interest. A machine learning system refers to a computer representation that can be tuned (e.g., trained) based on inputs to approximate unknown functions. In particular, machine learning systems can include a system that utilizes algorithms to learn from, and make predictions on, known data by analyzing the known data to learn to generate outputs that reflect patterns and attributes of the known data. For instance, a machine learning system can include decision trees, support vector machines, linear regression, logistic regression, Bayesian networks, random forest learning, dimensionality reduction algorithms, boosting algorithms, artificial neural networks, deep learning, and so forth.

A machine learning system can be trained by modifying features or weights of the machine learning system so that the machine learning system accurately determines the amount of colors in the region of interest. This training can be performed using supervised learning or unsupervised learning. For example, training data can include images of regions of interest and each image can have an associated tag indicating the amount of colors in the region of interest. The machine learning system is trained to generate amounts of colors in regions of interest so as to reduce or minimize a loss between the tags associated with the images and the amounts of colors generated by the machine learning system.

In one or more implementations, rather than averaging or otherwise combining the pixel values in the region of interest to determine the amounts of colors in the region of interest, the region of interest color determination module 304 identifies the color channels in the region of interest and generates subtraction images on a per-pixel basis. The region of interest color determination module 304 provides the color channels to the enhanced image generation module 306 as the region of interest colors 320.

Figure 6:
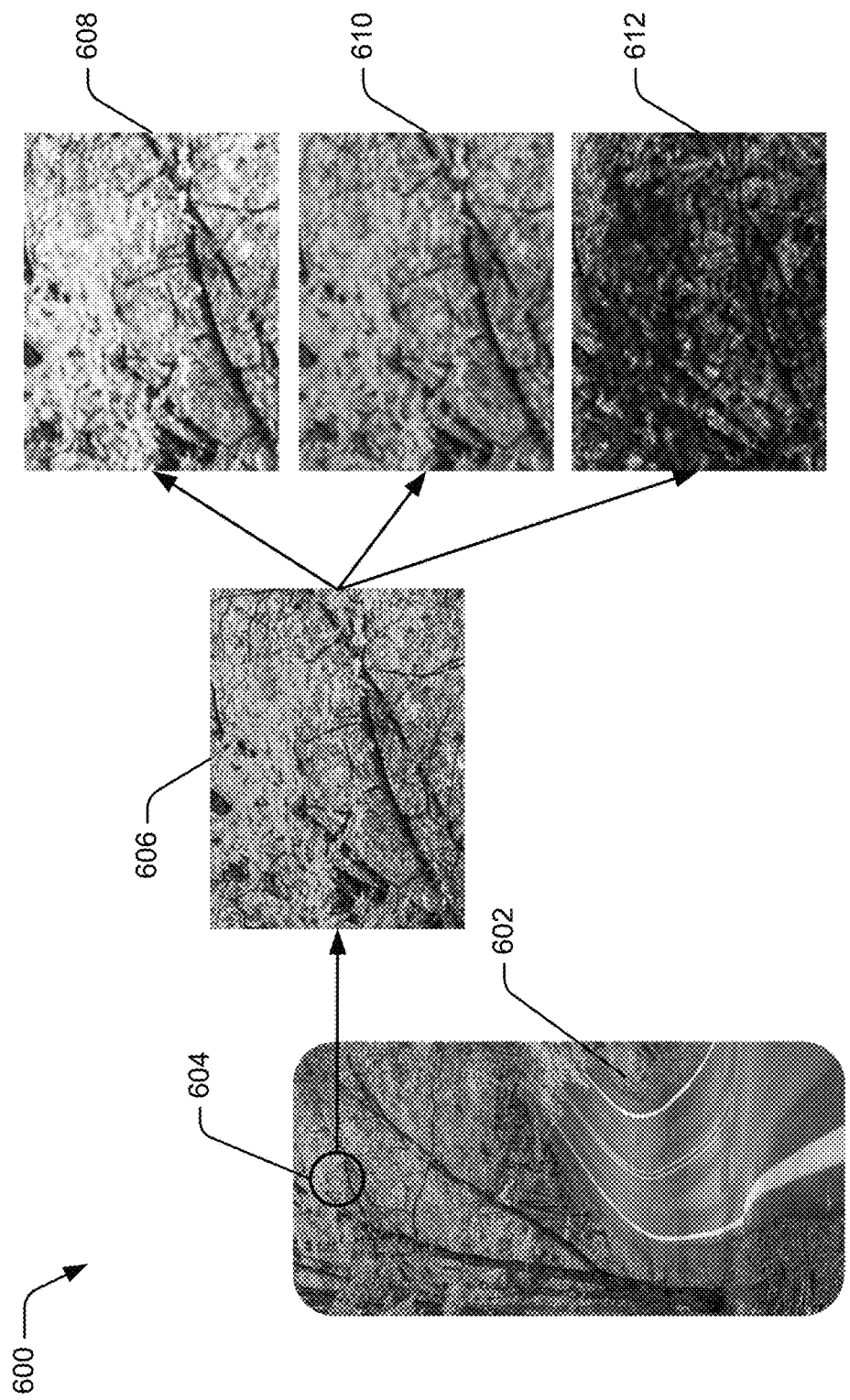
FIG. 6 illustrates an example of the color channels in a region of interest.

FIG. 6 illustrates an example 600 of the color channels in a region of interest. The display 602 is displaying an image (e.g., an autumn scene as illustrated). The region of interest 604 is illustrated, showing a predominately yellow/orange color in the region of interest 604. It should be noted that the region of interest 604 is illustrated with a circle, that circle need not be (and typically is not) displayed on the display 602.

The region of interest 604 corresponds to an image 606 that is the image that would be captured by the digital camera 110 if the region of interest 604 were to be captured by the digital camera 110. Given the known dimensions of the imager of the digital camera 110 and the lens of the digital camera, the circular region of interest 604 can be readily mapped to the image 606.

The enhanced image generation module 306 generates a color channel for each type of display pixel in the display 602. Each color channel is a grayscale image made from the image 606 using the colors of just one type of display pixel. In the illustrated example 600, the enhanced image generation module 306 generates a red channel 608 for the image 606, a green channel 610 for the image 606, and a red channel 612 for the image 606.

Figure 7:
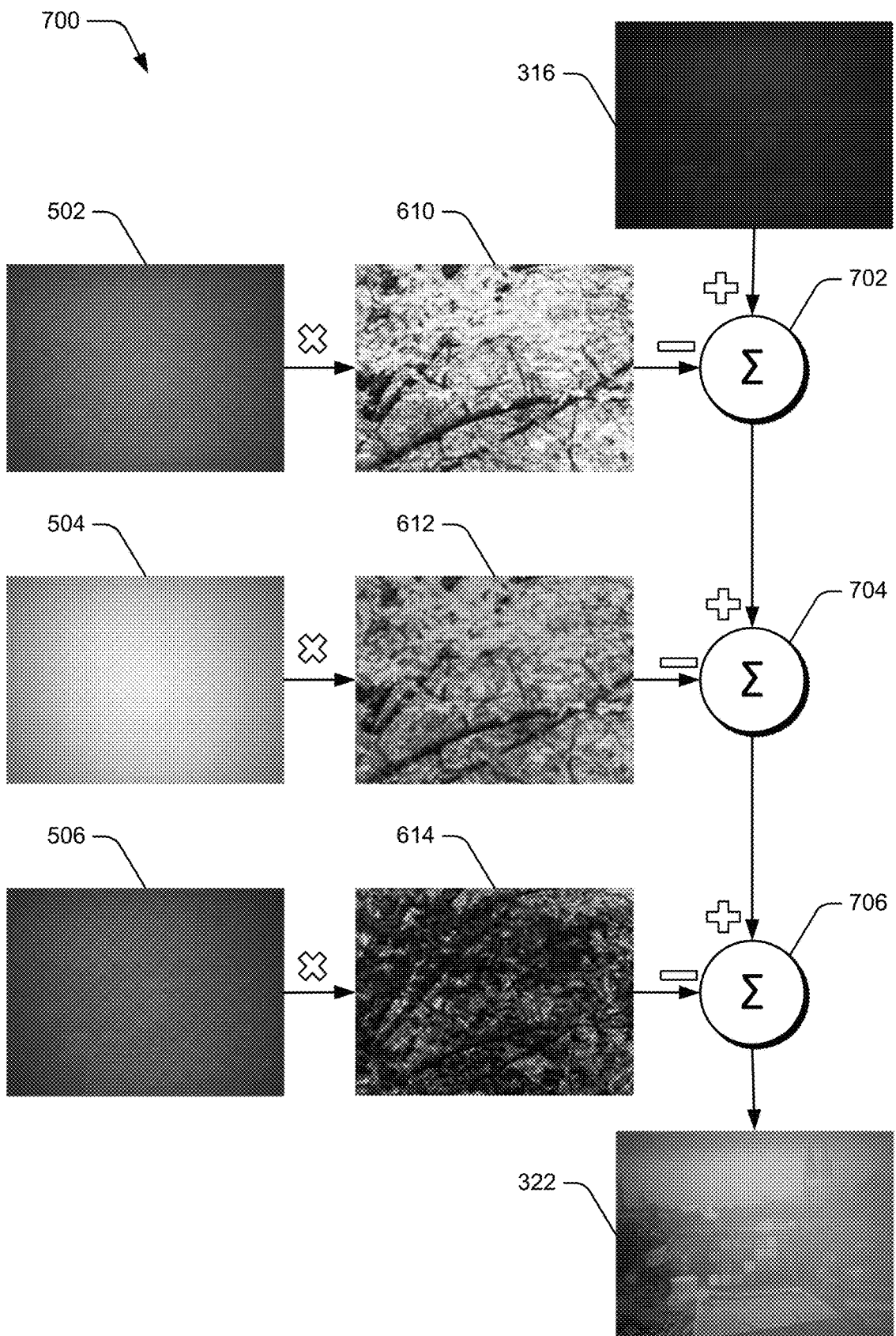
FIG. 7 illustrates another example of generating an enhanced output image.

FIG. 7 illustrates an example 700 of generating an enhanced output image. The example 700 is similar to the example 500 of FIG. 5, except that in the example 700 the enhanced image generation module 306 generates subtraction images on a per-pixel basis rather than averaging or otherwise combining the pixel values in the region of interest.

Illustrated in the example 700 are the red captured calibration image 502, the green captured calibration image 504, and the blue captured calibration image 506 as discussed above. Each captured calibration image 502, 504, and 506 is multiplied by a capture parameter ratio that accounts for differences in gain and integration time between the captured calibration images 312 and the captured image 316. In one or more implementations, the capture parameter ratio for a color C ($Ratio_C$) is generated as:

$$Ratio_C = \frac{\text{Captured\_Gain} * \text{Captured\_It}}{\text{Calibration\_Gain}_C * \text{Calibration\_IT}_C}$$

where Captured_Gain refers to the gain of the captured image 316, Captured_It refers to the integration time of the captured image 316, Calibration_Gain$_C$ refers to the gain of the captured calibration image 312 corresponding to color C, Calibration_IT$_C$ refers to the integration time of the captured calibration image 312 corresponding to color C.

For each color channel, the product of the capture parameter ratio and the captured calibration image 502, 504, and 506 is multiplied by the corresponding color channel 610, 612, and 614. This multiplication refers to multiplying the pixel value for each pixel in the captured calibration image 502, 504, and 506 (after being multiplied by the capture parameter ratio) by the pixel value for the corresponding color channel 610, 612, and 614, respectively. The resultant subtraction images are subtracted from the captured image 316, resulting in enhanced output image 322.

In the illustrated example, the subtraction refers to, for the red channel, subtracting 702 the pixel value for each pixel in the resultant subtraction image from the corresponding pixel in the captured image 316. For the green channel, subtracting 704 the pixel value for each pixel in the resultant subtraction image from the result of the subtracting 702. For the blue channel, subtracting 706 the pixel value for each pixel in the resultant subtraction image from the result of the subtracting 704, resulting in enhanced output image 322.

As illustrated in example 500, the enhanced image generation module 306 subtracts from the calibration image, for each color channel, a subtraction image corresponding to the light in that color channel emitted by the display 104 when displaying the displayed image 318. Accordingly, the enhanced output image 322 mitigates interference introduced by the display 104 when displaying the displayed image 318.

Returning to FIG. 3, in some situations the capture information 314 is not stored in the storage device 118. In such situations the gain and integration time of the captured calibration images 312 is known to the enhanced image generation module 306 and thus need not be received from the storage device 118.

Additionally or alternatively, in some situations the capture parameter ratio may be known to the enhanced image generation module 306 and thus need not be determined by the enhanced image generation module 306. For example, the calibration image collection module 302 and the camera module 108 may capture images using static (e.g., the same) gain and integration times so the capture parameter ratio would be readily known (e.g., if the gain and integration times for the captured calibration images 312 and the captured image 316 are the same then the capture parameter ratio is 1). By way of another example, the calibration image collection module 302 may store multiple sets of captured calibration images 312, such as one set of captured calibration images 312 for each possible gain and integration time the camera module 108 uses. In such situations, the set of captured calibration images 312 having the same gain and integration time as the captured image 316 are received from the storage device 118, in which case the capture parameter ratio is 1.

Examples of the enhanced image generation module 306 are discussed with reference to the combining or averaging of pixel values in FIG. 5 and subtracting images on a per-pixel basis in FIG. 7. Additionally or alternatively, the enhanced image generation module 306 can subtract images based on any grouping of pixels between per-pixel and a combining or averaging of pixel values. For example, the pixel values in the region of interest can be separated into quarters and a combined (e.g., average) value generated for each quarter.

The different captured calibration images 312 have different repeating patterns, as illustrated in FIGS. 5 and 7. These patterns are a result of, for example, the alignment of the display pixels in the display 104 with the imager pixels in the digital camera 110. In one or more implementations, the region of interest color determination module 304 identifies the repeating patterns in the captured calibration images and uses as a grouping of pixels for each captured calibration image 312, one occurrence of the pattern. The pixel values in the one occurrence of the pattern are combined (e.g., averaged or otherwise analogous to the discussion above) to generate a color corresponding to the single occurrence, also referred to herein as a pattern color. For each occurrence of the pattern in the calibration image, this pattern color is used as the $Color\_Amount_C$ in generating the $Multiplier_C$.

In one or more embodiments, in situations in which the region of interest color determination module 304 identifies the repeating patterns in calibration images, the display module 106 activates only the pixels of the display 104 in the camera region 112 that include one occurrence of the pattern. As the pattern is repeating, the captured single occurrence of the pattern is used without the need to capture the entire camera region 112. Additionally or alternatively, the display module 106 activates less than the entire camera region 112 but the pixels of the display in the camera region 112 displaying multiple occurrences of the pattern.

Discussion is included herein of the enhanced image generation module 306 generating the enhanced output image 322 by subtracting one or more subtraction images from the captured image 316. Additionally or alternatively, the enhanced image generation module 306 generates the enhanced output image 322 in other manners based on one or more of the captured image 316, the displayed image 318, and the captured calibration images 312. For example, a machine learning system can be trained by modifying features or weights of the machine learning system so that the machine learning system generates the enhanced output image 322. This training can be performed using supervised learning or unsupervised learning. For example, training data can include sets of data, each set of data including a captured image and a displayed image. Each set of the training data can have an associated tag, such as a target enhanced output image that is the image that would be captured by the camera module 108 if there were no interference from the display 104. For example, the target enhanced output image can be captured while the display 104 is turned off (not emitting any light). The machine learning system is trained to generate enhanced output images so as to reduce or minimize a loss between the tags associated with the sets of training data and the enhanced output images generated by the machine learning system. Various additional data is also optionally included in the training data, such as the captured calibration images.

In one or more embodiments, the calibration image collection module 302 stores multiple sets of captured calibration images 312, such as different sets of captured calibration images 312 for different temperature thresholds (e.g., for sensed temperature external to the client device 102, sensed temperature internal to the client device 102, sensed temperature internal to a particular component of the client device 102 such as the display 104). For example, one set of captured calibration images 312 is used if the sensed temperature is below a temperature threshold and a different set of captured calibration images 312 is used if the sensed temperature is at or above the temperature threshold. Use of such different sets of captured calibration images 312 allows the display interference mitigation system 300 to account for changes to the display or capture of calibration images based on temperature.

Additionally or alternatively, the enhanced image generation module 306 may use interpolation to determine, when generating subtraction images, temperature-based calibration images based on two different captured calibration images 312. For example, two sets of captured calibration images 312 may be stored, one set captured at a low temperature (e.g., a lowest typical temperature for the client device 102) and another set captured at a high temperature (e.g., a highest typical temperature for the client device 102). When generating subtraction images, the enhanced image generation module 306 interpolates, based on a current temperature, between the set of low temperature calibration images and the set of high temperature calibration images to determine a set of calibration images based on the current temperature and uses that determined set of calibration images to generate the subtraction images. The enhanced image generation module 306 can use various types of interpolation, such as linear interpolation or other interpolation shapes.

In one or more embodiments, the display interference mitigation system (e.g., display interference mitigation system 116 of FIG. 1 or display interference mitigation system 300 of FIG. 3) includes a recalibration module. The alignment and geometries of the display pixels in the display 104 to the imager pixels in the digital camera 110 result in various patterns being formed in the calibration and other captured images as discussed above. These patterns can change if this alignment or geometry of the display pixels to the imager pixels changes for any reason. Accordingly, in various situations the recalibration module causes new captured calibration images to be collected to reflect the change (or potential change) in alignment or geometry of the display pixels to the imager pixels changes.

Figure 8:
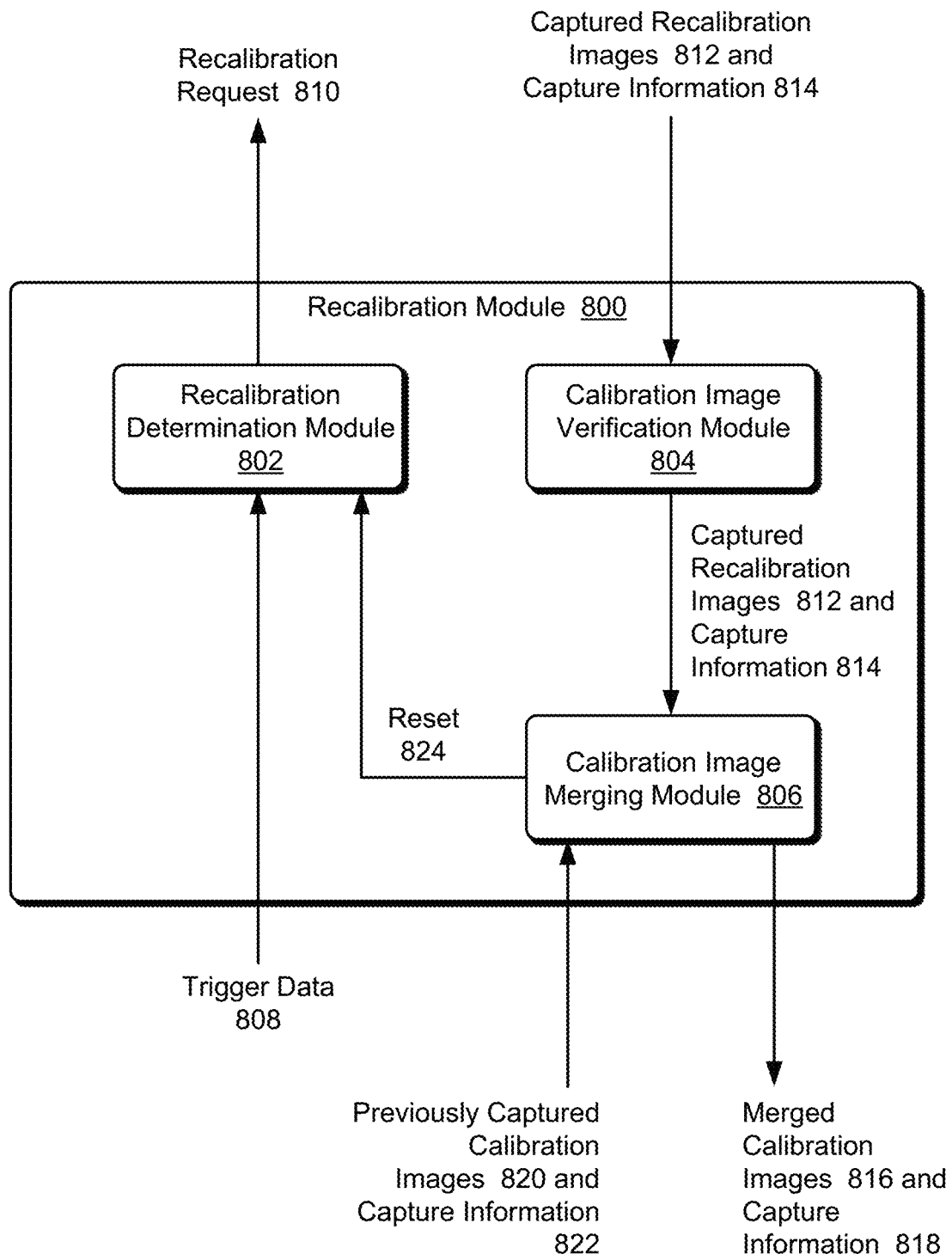
FIG. 8 illustrates an example recalibration module.

FIG. 8 illustrates an example recalibration module 800. In one or more implementations, the recalibration module 800 is included in a display interference mitigation system (e.g., display interference mitigation system 116 of FIG. 1 or display interference mitigation system 300 of FIG. 3). The recalibration module 800 includes a recalibration determination module 802, a calibration image verification module 804, and a calibration image merging module 806.

Generally, the recalibration determination module 802 determines, based on various trigger data 808, when to collect new calibration images, also referred to as recalibration images. When recalibration images are collected, the calibration image verification module 804 receives the recalibration images and the calibration image merging module 806 merges or blends the recalibration images with the previously stored calibration images.

The recalibration determination module 802 receives trigger data 808 from various different sources and determines, based on the trigger data 808, when a trigger event has occurred. A trigger event refers to anything that may cause or indicate a change in the alignment or geometries of the display pixels to the imager pixels, and thus indicates that the recalibration module 800 is to collect recalibration images. In response to a trigger event occurring, the recalibration determination module 802 determines a time to collect the recalibration images based on the environment in which the client device 102 is located.

The recalibration determination module 802 receives trigger data 808 from any of a variety of different sources, such as various sensors in the client device 102, an operating system of the client device 102, the digital camera 110, and so forth. In one or more embodiments, the recalibration determination module 802 receives trigger data 808 from various low power sensors, such as one or more of a proximity sensor, an ambient light sensor, an accelerometer, a gyroscope, and so forth. These low power sensors typically consume less power than the digital camera 110. By using data from a low power sensor to determine whether a trigger event has occurred or to determine a time to collect the recalibration images allows the client device 102 to conserve power by not activating or waking the higher powered digital camera 110 until a trigger event occurs and its time for the recalibration images to be collected.

The recalibration determination module 802 determines when a trigger event occurs in any of a variety of different manners. In one or more embodiments, the recalibration determination module 802 determines when a trigger event occurs based on elapsed time, such as determining that a trigger event occurs at regular or irregular intervals (e.g., weekly). The trigger data 808 includes an indication of timing in the client device 102, such as an indication of a current time, an indication that a timer has expired, and so forth. This indication of timing can be received from various sources, such as an operating system running on the client device 102.

Additionally or alternatively, the recalibration determination module 802 determines when a trigger event occurs based on temperature. The trigger data 808 includes an indication of the internal temperature of the client device 102 (or a component of the client device, such as the display 104) or the external temperature (e.g., the temperature of an environment in which the client device 102 is located). For example, the recalibration determination module 802 determines that a trigger event occurs in response to the internal temperature exceeding a first threshold value or dropping below a second threshold value, or in response to the external temperature exceeding a third threshold value or dropping below a fourth threshold value.

Additionally or alternatively, the recalibration determination module 802 determines when a trigger event occurs based on movement of the client device 102. For example, the recalibration determination module 802 determines that a trigger event occurs in response to the client device 102 being dropped or bumped. The trigger data 808 includes an indication of whether the client device 102 has been dropped or bumped, such as a notification from an operating system running on the client device 102 that the client device 102 has been dropped or bumped, indications of movement (e.g., amount, type, rate, etc.) detected by an accelerometer or gyroscope, and so forth. In situations in which the training data 808 includes indications of movement (e.g., amount, type, rate, etc.), the recalibration determination module 802 uses any of a variety of public or proprietary techniques to determine whether the client device 102 has been dropped or bumped. E.g., movement data indicating a vertical drop followed by an abrupt stop can indicate the client device 102 was dropped or fell, movement data indicating an abrupt change in approximately horizontal movement can indicate the client device 102 was bumped, and so forth.

Additionally or alternatively, the recalibration determination module 802 determines when a trigger event occurs based on authentication failures by the client device 102. For example, the trigger data 808 includes an indication that user authentication based on a captured image failed (e.g., facial features or fingerprint features in an image captured by the digital camera 110 were not recognized followed by the user providing a password or personal identification number to authenticate himself). The trigger data 808 includes an indication of when user authentication based on a captured image failed, such as an indication from an operating system running on the client device 102 or an indication from a security or authentication system of the client device 102.

Various different manners for determining when a trigger event occurs are discussed herein. It is to be appreciated that the recalibration determination module 802 can use any one or combination of these different manners in determining when a trigger event occurs. For example, the recalibration determination module 802 may determine that a trigger event occurs using any one of the different manners discussed herein. By way of another example, the recalibration determination module 802 may determine that a trigger event occurs when at least two of the different manners discussed herein (e.g., the internal temperature of the display 104 exceeds a first threshold value and user authentication based on a captured image failed).

In response to a trigger event occurring, the recalibration determination module 802 determines a time to collect the recalibration images based on the current environment in which the client device 102 is located. This determination is made based on any of a variety of criteria. In one or more embodiments, the recalibration determination module 802 determines to collect the recalibration images while the client device 102 is in a low light environment. The light level in the current environment can be obtained from various sensors, such as the imager of the camera 110 (e.g., exposure information in the camera 110), an ambient light sensor, and so forth. A low light environment refers to an environment where the light level (e.g., the ambient light level) is less than a threshold amount, such as 1 lux. Generally, lower amounts of light in the environment allow the recalibration images to be captured more accurately because they include only the light generated by the display 104 rather than additional light from other sources.

Additionally or alternatively, the recalibration determination module 802 determines a time to collect the recalibration images based on whether an object is in close proximity to the display 104. Whether an object is in close proximity to the display 104 can be determined based on data or indications from various sensors, such as a proximity sensor that determines proximity of objects in front of the display 104 (e.g., objects that are potentially within the field of view of the digital camera 110). Such a proximity sensor can provide an indication that an object is within a threshold distance of the display 104, provide data indicating a distance of a closest object to the display 104, and so forth. An object in close proximity to the display 104 refers to an object within a threshold distance of the display 104, such as 6 inches.

The digital camera 110 captures images through the display 104 so if an object is in close proximity to the display 104 the captured recalibration images are more likely to include light emitted from the display 104 and reflected by the object, leading to captured recalibration images that are more likely to include the reflected light and thus less accurately capture just the light emitted by the display 104. Accordingly, the recalibration determination module 802 determines to collect the recalibration images while there is no object in close proximity to the display 104.

Additionally or alternatively, the recalibration determination module 802 determines a time to collect the recalibration images based on an orientation of the client device 102. The orientation of the client device 102 can be determined based on data or indications from various sensors, such as accelerometer or gyroscope sensors. Such sensors can provide an indication of the orientation of the client device 102 (e.g., whether the client device 102 is in a horizontal orientation, whether the display 104 is facing up (e.g., facing away from the Earth rather than towards the Earth)), data indication the direction the display 104 is facing in three dimensional space, and so forth.

The digital camera 110 captures images through the display 104 so if an object is in close proximity to the display 104 the captured recalibration images are more likely to include light emitted from the display 104 and reflected by the object, leading to captured recalibration images that are more likely to include the reflected light and thus less accurately capture just the light emitted by the display 104. If the client device 102 is in a horizontal orientation with the display 104 facing up, the client device 102 is more likely to be resting on a table or other surface without objects above it that would reflect light. In contrast, if the client device 102 is in a vertical orientation with the display facing perpendicular to the ground, the client device 102 is more likely to be in purse, pocket, backpack, or other carrying device that would reflect light or that would include other objects that reflect light. Accordingly, the recalibration determination module 802 determines to collect the recalibration images while the client device 102 is in a horizontal orientation (or within a threshold amount of a horizontal orientation, such as 5 degrees) and the display 104 is facing up (or is within a threshold amount of facing up, such as 5 degrees).

Additionally or alternatively, the recalibration determination module 802 determines a time to collect the recalibration images based on a motion of the client device 102. Whether the client device 102 is in motion or at rest can be determined based on data or indications from various sensors, such as accelerometer or gyroscope sensors. Such a sensor can provide an indication that the client device 102 is moving or not moving (e.g., at rest or stationary), provide data indicating a speed at which the client device 102 is moving, and so forth.

The digital camera 110 captures images through the display 104 so if an object is in close proximity to the display 104 the captured recalibration images are more likely to include light emitted from the display 104 and reflected by the object, leading to captured recalibration images that are more likely to include the reflected light and thus less accurately capture just the light emitted by the display 104. If the client device 102 is at rest, the client device 102 is more likely to be resting at a location surface without objects in front of the display 104 that would reflect light. In contrast, if the client device 102 is moving, the client device 102 is more likely to encounter objects in front of the display 104 that reflect light. Accordingly, the recalibration determination module 802 determines to collect the recalibration images while the client device 102 is at rest (or within a threshold amount of at rest, such as moving 1 inch per second).

Additionally or alternatively, the recalibration determination module 802 determines to collect the recalibration images while the client device 102 is at rest relative to a vehicle that the client device 102 is traveling in. For example, if the client device 102 is moving at greater than 45 miles per hour, the recalibration determination module 802 can determine that the client device 102 is in a car, train, plane, or other vehicle. Accordingly, the client device 102 may be less likely encounter objects in front of the display 104 that reflect light.

Additionally or alternatively, the recalibration determination module 802 determines a time to collect the recalibration images based on whether the client device 102 is charging (e.g., a battery of the client device 102 is currently being recharged) or physically connected to another device or outlet (e.g., via a universal serial bus (USB) cable). Whether the client device 102 is charging or connected to another device or outlet can be determined based on data or indications from various sources, such as an indication from an operating system on the client device 102 that the client device 102 is charging or connected to another device or outlet, an indication that the client device 102 is connected to another device or outlet via a USB cable, and so forth.

The digital camera 110 captures images through the display 104 so if an object is in close proximity to the display 104 the captured recalibration images are more likely to include light emitted from the display 104 and reflected by the object, leading to captured recalibration images that are more likely to include the reflected light and thus less accurately capture just the light emitted by the display 104. If the client device 102 is charging or connected to another device or outlet, the client device 102 is more likely to be at a location without objects in front of the display 104 that would reflect light. In contrast, if the client device 102 is not charging and is not connected to another device or outlet, the client device 102 is more likely to be moving or be elsewhere and thus encounter objects in front of the display that reflect light. Accordingly, the recalibration determination module 802 determines to collect the recalibration images while the client device 102 is charging or connected to another device or outlet.

Various different criteria for determining a time to collect recalibration images in response to a trigger event are discussed herein. It is to be appreciated that the recalibration determination module 802 can use any one or combination of these criteria. For example, the recalibration determination module 802 may determine to collect calibration recalibration images in response to the client device 102 being in a low light environment. By way of another example, the recalibration determination module 802 may determine to collect recalibration images in response to the client device 102 being in a low light environment no object is in close proximity to the display 104. By way of another example, the recalibration determination module 802 may determine to collect recalibration images in response to the client device 102 being in a low light environment as well as in a horizontal orientation with the display 104 facing up.

In one or more embodiments, the recalibration determination module 802 activates the display 104 in response to determining it is currently time to collect recalibration images. The display 104 is activated by communicating a screen activation request to the display module 106. In response to the screen activation request, if the display 104 is not already activated then the display module 106 activates the display 104 (e.g., wakes the display 104 from a low power mode). This allows the display 104 to be activated and ready to display the calibration images 310, allowing the captured recalibration images to be captured.

Similarly, in one or more embodiments, the recalibration determination module 802 activates the digital camera 110 in response to determining it is currently time to collect recalibration images. The digital camera 110 is activated by communicating a camera activation request to the camera module 108. In response to the camera activation request, if the digital camera 110 is not already activated then the camera module 108 activates the digital camera 110 (e.g., wakes the digital camera 110 from a low power mode). This allows the digital camera 110 to be activated and ready to capture the displayed calibration images 310.

In response to determining that a trigger event has occurred and it is currently a time to collect the recalibration images, the recalibration determination module 802 sends a calibration request 810 to the calibration image collection module 302 of FIG. 3. In response to the calibration request 810, the calibration image collection module 302 sends calibration images 310 (or an indication to the display module 106 to activate only particular pixels of the display 104) to the display module 106 and receives captured calibration images 312 and capture information 314 from the camera module 108 as discussed above. In one or more embodiments, the calibration images 310 are the same calibration images as were used to previously or initially collect the captured calibration images 312. These calibration images 310 and the captured calibration images 312 are displayed and captured analogous to the discussion above, except are performed in response to the recalibration request 810. Accordingly, the captured calibration images 312 may differ from previous captured calibration images 312 due to changes in alignment or geometry of the display pixels to the imager pixels. These captured calibration images 312 are captured in response to the recalibration request 810 and thus are also referred to as recalibration images. These recalibration images have corresponding capture information analogous to and capture information 314 discussed above.

The calibration image verification module 804 receives the captured recalibration images 812 and capture information 814 from the calibration image collection module 302 and provides the captured recalibration images 812 and capture information 814 to the calibration image merging module 806. In one or more embodiments the calibration image verification module 804 provides the captured recalibration images 812 and capture information 814 to the calibration image merging module 806 without analyzing the captured recalibration images 812. Additionally or alternatively, the calibration image verification module 804 analyzes the captured recalibration images 812 and determines whether to merge or blend the calibration images 812 with the previously stored calibration images (e.g., captured calibration images 312 of FIG. 3).

As discussed above, situations can arise where light received from various objects can be captured by the digital camera 110 when capturing the recalibration images. These reflections are, for example, reflections of the light emitted by the display 104 while the recalibration images are captured. In one or more embodiments, the calibration image verification module 804 analyzes the captured recalibration images 812 to determine whether an aberration is present in the captured recalibration images 812. Such an aberration is, for example, light reflected from an object in front of the display 104 and captured by the digital camera 110 or a result of user interruption with the client device 102 during capture of the captured recalibration images 812.

The calibration image verification module 804 can identify aberrations in any of a variety of different manners. As discussed above, each recalibration image is a single color (e.g., red, green, or blue), although each captured recalibration image can have various repeating patterns. In one or more embodiments, the calibration image verification module 804 analyzes the captured recalibration images 812 to identify one or more non-repeating patterns in each of the captured recalibration images 812. A non-repeating pattern is likely to be a reflection from an object and thus is treated as an aberration. Additionally or alternatively, the calibration image verification module 804 analyzes the captured recalibration images 812 to identify blur (e.g., resulting from movement of the client device 102 by the user) or other artifacts in the captured recalibration images 812 that are treated as an aberration.

The calibration image verification module 804 also optionally determines a size of the aberration. Light reflecting from an object is likely to result in a larger non-repeating pattern (e.g., in terms of size in pixels or in terms of intensity relative to other portions of the captured recalibration image) than a change in the alignment or geometry of the display pixels to the imager pixels or damage done to the digital camera 110 (e.g., a bad pixel in the imager of the digital camera 110). Accordingly, the calibration image verification module 804 determines that the aberration is the result of light reflecting from an object if the size of the aberration exceeds a threshold amount (e.g., has a size that exceeds a number of pixels that is 25% larger than the number of pixels in the repeating pattern for the image, has an intensity that exceeds an intensity that is 25% larger than the average intensity for pixels in the image).

In one or more embodiments, the calibration image verification module 804 determines whether an aberration in a captured recalibration image is the result of light reflecting from an object based on additional captured recalibration images or a result of user interruption. For example, assume the captured recalibration images 812 include a red image, a green image, and a blue image. If an aberration occurs in each of the three images at slightly different locations, the calibration image verification module 804 can determine that the aberration is the result of light reflecting from a moving object (e.g., a fan blade). This determination can be made even if, for example, the size of the aberration does not exceed a threshold amount.

In one or more embodiments, for each captured recalibration image 812 that does not have any aberrations determined to be the result of light reflecting from an object, the calibration image verification module 804 provides the captured recalibration image 812 to the calibration image merging module 806 for merging. If captured recalibration image 812 has an aberration determined to be the result of light reflecting from an object or a result of user interruption, then the calibration image verification module 804 does not provide the captured recalibration image 812 to calibration image merging module for merging. This allows the recalibration module 800 to avoid merging a captured recalibration image that has a significant aberration with a previously captured calibration image or recalibration image. Additionally or alternatively, if the captured recalibration image 812 has an aberration determined to be the result of light reflecting from an object or a result of user interruption then the calibration image verification module 804 provides the captured recalibration image 812 as well as an indication of the location of the aberration to the calibration image merging module 806. This allows the calibration image merging module 806 to merge the portion of the captured recalibration image 812 without the aberration with a previously captured calibration image or recalibration image.

In one or more embodiments, the recalibration module 800 merges captured recalibration images with previously captured calibration images or recalibration images on a per-image basis. For example, if the captured recalibration images 812 include a red image, a green image, and a blue image, then one of those images (e.g., the red image) may be merged with a previously captured calibration image or recalibration image whereas another of those images (e.g., the blue image) may not be merged with a previously captured calibration image or captured recalibration image because of an aberration in that image (e.g., the blue image) determined to be the result of light reflecting from an object or a result of user interruption.

Additionally or alternatively, the recalibration module 800 merges captured recalibration images with previously captured calibration images or recalibration images on a group basis. For example, if the captured recalibration images 812 include a red image, a green image, and a blue image, then each of those images is merged with a corresponding previously captured calibration image or captured recalibration image only if all three of the captured recalibration images 812 do not have an aberration determined to be the result of light reflecting from an object or a result of user interruption.

The calibration image merging module 806 merges the captured recalibration images 812 with the previously captured calibration images stored in the storage device 118. These previously captured calibration images can be the initially captured calibration images 312 as discussed above or previously captured recalibration images 812. In the discussions herein these previously captured recalibration images are also referred to as previously captured calibration images.

In one or more embodiments, the calibration image merging module 806 merges the captured recalibration images 812 with the previously captured calibration images by replacing the previously captured calibration images in the storage device 118 with the captured recalibration images 812, illustrated as merged calibration images 814. The calibration image merging module 806 also stores the capture information 818 corresponding to the merged calibration images 814 in the storage device 118.

Additionally or alternatively, the calibration image merging module 806 merges the captured recalibration images 812 with the previously captured calibration images 820 by retrieving the previously captured calibration images 820 from the storage device 118 and blending the previously captured calibration images 820 with the captured recalibration images 812. The calibration image merging module 806 replaces the previously captured calibration images in the storage device 118 with the blended calibration images, illustrated as merged calibration images 816. The calibration image merging module 806 also stores the capture information 818 corresponding to the blended calibration images in the storage device 118.

The calibration image merging module 806 can blend a previously captured calibration image 820 with a captured recalibration image 812 in any of a variety of different manners. In one or more embodiments, the two images are blended by using a ratio of the previously captured calibration image 820 to the captured recalibration image 812, such as an 80/20 ratio or a 50/50 ratio. For example, using an 80/20 ratio, the blended calibration image is generated by adding, for each pixel value in the blended calibration image, 80% of the value of the corresponding pixel value in the captured recalibration image 812 and 20% of the value of the corresponding pixel value in the previously captured calibration image 820. Similarly, capture information for the blended calibration image in this example is generated by adding 80% of the value of the capture information 814 (e.g., each of the gain and integration time) for the captured recalibration image 812 and 20% of the value of the capture information 822 (e.g., each of the gain and integration time) for the previously captured calibration image 820 received from the storage device 118. Optionally, the two images are registered (alighted) prior to being blended to account for, e.g., changes in the hardware between the times when the two images were captured.

Additionally or alternatively, recalibration images 812 may be captured using the same capture information (e.g., gain and integration time) as the previously captured calibration images 312. This can be accomplished in various manners, such as the calibration image collection module 302 indicating to the camera module 108 the capture information to use to capture the recalibration images. In such situations, the capture information 814 need not be received from the calibration image collection module 302. Rather, the capture information 822 received from the storage device 118 can be used as the capture information 814.

Additionally or alternatively, the calibration image merging module 806 uses multiple previously captured calibration images 820 and capture information 822. Multiple previously captured calibration images 820 and capture information 822 can be maintained in the storage device 118 and weighted differently to generate the blended image. For example, a 60/30/10 ratio may be used, resulting in a blended image obtained by adding 60% of the value of the pixels from the captured recalibration image 812, 30% of the value of the pixels from a first previously captured calibration image 820 (e.g., most recent captured calibration image 820), and 10% of the value of the pixels from a second previously captured calibration image 820 (e.g., second most recent captured calibration image 820).

Discussion is included herein of the calibration image merging module 806 blending the previously captured calibration images 820 with the captured recalibration images 812. Additionally or alternatively, the calibration image merging module 806 blends a previously captured calibration image 820 with a captured recalibration image 812 using a machine learning system. For example, a machine learning system can be trained by modifying features or weights of the machine learning system so that the machine learning system generates the merged calibration image 816. This training can be performed using supervised learning or unsupervised learning. For example, training data can include sets of data, each set of data including a previously captured calibration image and a captured recalibration image. Each set of the training data can have an associated tag, such as a merged calibration image that would be a good merging of the previously captured calibration image and the captured recalibration image. For example, the good merging of the two images can be manually generated. The machine learning system is trained to generate merged calibration images so as to reduce or minimize a loss between the tags associated with the sets of training data and the merged calibration images generated by the machine learning system.

As discussed above, in one or more embodiments a portion of a captured recalibration image 812 includes an aberration. In such situations, the calibration image merging module 806 generates a blended calibration image using the portion of the captured recalibration image 812 that does not include the aberration and at least the portion of the previously captured calibration image 820 that corresponds to the aberration. For example, the calibration image verification module 804 provides an indication to the calibration image merging module 806 of the portion of the captured recalibration image 812 that includes the aberration. For the portion of the captured recalibration image 812 that includes the aberration, the calibration image merging module 806 generates the blended image by using as the pixel values in the blended image the pixel values from the previously captured calibration image 820 that correspond to the pixel values in the portion of the captured recalibration image 812 that includes the aberration. For the portion of captured recalibration image 812 that does not include the aberration, the calibration image merging module 806 generates the blended image by using as the pixel values in the blended image the pixel values from the previously captured calibration image 820 that correspond to the pixel values in the portion of the captured recalibration image 812 that does not include the aberration or by otherwise combining the pixel values from the previously captured calibration image 820 and the captured recalibration image 812, such as in accordance with some ratio as discussed above.

In situations in which a portion of a captured recalibration image 812 includes an aberration, the calibration image merging module 806 can determine the capture information for the blended image in a variety of different manners. In one or more embodiments, the capture information for the blended image is the capture information 822 for the previously captured calibration image 820 as discussed above. Additionally or alternatively, the capture information 822 for the previously captured calibration image 820 and the capture information 814 for the captured recalibration image 812 can be combined in the same manner (e.g., the same ratio) as the pixel values for the portion of the captured recalibration image 812 that does not include the aberration were combined.

After the merged calibration images 816 have been stored in the storage device 118, the calibration image merging module 806 sends a reset 824 indication to the recalibration determination module 802. The reset indication 824 notifies the recalibration determination module 802 that the recalibration images have been captured, merged, and stored in the storage device 118. In response to the reset indication 824, the recalibration determination module 802 resumes analyzing trigger data 808 to determine when a trigger event occurs.

It should be noted that in some situations multiple sets of calibration images are collected by the calibration image collection module 302, such as a different set of calibration images for each of multiple different gain and integration time values. In such situations, the same sets of recalibration images are also collected in response to the recalibration request 810.

Returning to FIG. 3, in one or more embodiments the display interference mitigation system (e.g., display interference mitigation system 116 of FIG. 1 or display interference mitigation system 300 of FIG. 3) includes a brightness adjustment module. The brightness adjustment module mitigates interference from the display 104 when capturing an image by adjusting a brightness of the display. The brightness adjustment module can use various different techniques to adjust the brightness of the display as discussed in more detail below.

Figure 9:
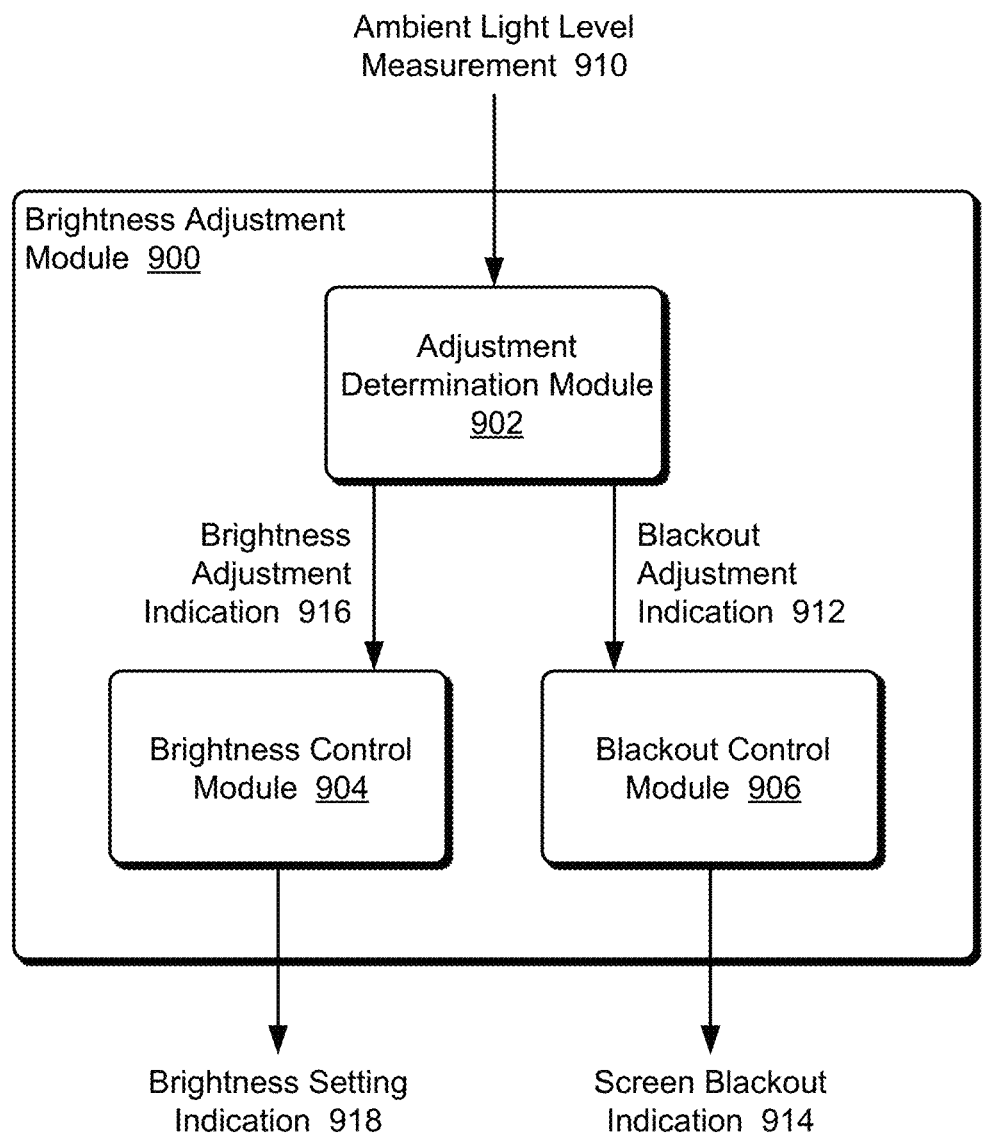
FIG. 9 illustrates an example brightness adjustment module.

FIG. 9 illustrates an example brightness adjustment module 900. In one or more implementations, the brightness adjustment module 900 is included in a display interference mitigation system (e.g., display interference mitigation system 116 of FIG. 1 or display interference mitigation system 300 of FIG. 3). Accordingly, the brightness adjustment module 900 can be used in conjunction with the techniques using calibration images and recalibration images, resulting in enhanced output images being displayed concurrent with the brightness adjustments being made by the brightness adjustment module 900. Additionally or alternatively, the brightness adjustment module 900 may be the display interference mitigation system 116 of FIG. 1, in which case display interference mitigation system 116 need not generate and capture calibration images, need not generate and capture recalibration images, and need not generate an enhanced output image.

The brightness adjustment module 900 includes an adjustment determination module 902, a brightness control module 904, and a blackout control module 906. Generally, the adjustment determination module 902 determines whether to adjust the brightness of the display 104 or blackout a portion of the display 104 while the digital camera 110 is capturing an image to reduce or eliminate the effect of light emitted by the display 104 on the image captured by the digital camera 110. In situations in which the brightness of the display 104 is to be adjusted, the brightness control module 904 determines when and how to reduce the brightness of the display 104. In situations in which a portion of the display 104 is to be blacked out, the blackout control module 906 determines the portion of the display 104 to black out and when that portion is to be blacked out.

Although the brightness adjustment module 900 is illustrated as including the brightness control module 904 and the blackout control module 906, additionally or alternatively the brightness adjustment module 900 need not include both modules 904 and 906. For example, if the brightness adjustment module 900 does not support adjusting the brightness of the display 104 then the brightness control module 904 need not be included in the brightness adjustment module 900. By way of another example, if the brightness adjustment module 900 does not support blacking out a portion of the display 104 then the blackout control module 906 need not be included in the brightness adjustment module 900.

The adjustment determination module 902 receives an ambient light level measurement 910. The ambient light level measurement 910 is an indication of the light level in the environment in which the client device 102 is located. In one or more embodiments the ambient light level measurement 910 is obtained from a low power ambient light sensor as discussed above. Additionally or alternatively, the ambient light level measurement 910 may be obtained from other sensors, such as the digital camera 110 (e.g., the ambient light level measurement 910 may be a lux level measured by an imager of the digital camera 110).

Generally, the lower the ambient light level, the more that the light emitted from the display 104 will interfere with images captured by the digital camera 110. In one or more embodiments, when the ambient light level is high enough (e.g., at least 50,000 lux) the light emitted from the display 104 does not have a visual effect that interferes with images captured by the digital camera 110 and thus the display interference mitigation system 116 need not take any action to mitigate interference from the light emitted from the display 104.

The adjustment determination module 902 determines an appropriate technique to use to mitigate interference from the light emitted from the display 104 based at least in part on the ambient light level measurement 910. In one or more embodiments, the adjustment determination module 902 determines the appropriate technique to use by balancing mitigation of the interference in the captured image and disruption of the user experience. E.g., the adjustment determination module 902 selects the appropriate technique so that the interference in the captured image is mitigated while the disruption to the user experience is least obtrusive (e.g., is reduced or minimized).

In one or more embodiments, the adjustment determination module 902 determines which technique to use (e.g., blacking out a portion of the screen or reducing the brightness of the screen) based on the ambient light level measurement and different threshold levels. As an example, for low light situations (e.g., less than 50 lux) the adjustment determination module 902 determines to black out a portion of the display 104, for medium level light situations (e.g., between 50 lux and 1000 lux) the adjustment determination module 902 determines to reduce the brightness of the display 104, for medium to high level light situations (e.g., between 1000 lux and 50,000 lux) the adjustment determination module 902 determines to strobe the display 104, and for high light situations (e.g., more than 50,000 lux) the adjustment determination module 902 determines to take no action to mitigate interference from the light emitted from the display 104.

It should be noted that the threshold levels for using these different techniques oftentimes vary based on the particular model or type of display 104 as well as the particular model or type of digital camera 110 implemented in the client device 102. Different models or types of digital cameras 110 have different light sensitivities and accordingly can have different threshold levels for using these different techniques. Similarly, different models or types of displays 104 have different characteristics as a result of employing different techniques to make the display 104 for the digital camera 110 to capture images through, such as by reducing the number of pixels in the camera region 112 of FIG. 1 relative to the peripheral regions 114 of FIG. 1, changing the geometry of pixels in the camera region 112 relative to the peripheral regions, changing the brightness of pixels in the camera region 112 relative to the peripheral regions 114, and so forth. These different characteristics cause the different models or types of displays 104 to have different threshold levels for using these different techniques.

For example, one client device 102 may use one particular type of digital camera 110 and one particular type of display 104, resulting in reducing display brightness when the ambient light level measurement is between 40 and 50 lux being sufficient to mitigate interference from light emitted from the display 104. Accordingly, in that client device 102 the display brightness is reduced when the ambient light level measurement is between 40 and 50 lux rather than blacking out a portion of the display 104. However, another client device 102 may use a different type of digital camera 110 and a different type of display 104, resulting in reducing display brightness when the ambient light level measurement is between 40 and 50 lux being insufficient to mitigate interference from light emitted from the display 104. Accordingly, in that client device 102 a portion of the display 104 is blacked out when the ambient light level measurement is between 40 and 50 lux rather than reducing the display brightness.

The appropriate threshold levels for using these different techniques for different combinations of display and digital camera types can be determined in any of a variety of different manners. In one or more embodiments, the appropriate threshold levels are determined empirically with a developer or designer viewing the differences in captured images using different ambient light levels, different threshold levels, and the different techniques to a baseline image (e.g., an image captured when the display 104 is turned off and not emitting light). Additionally or alternatively, a configuration module on the client device 102 can determine the appropriate threshold levels by determining how close images captured using different ambient light levels, different threshold levels, and the different techniques are to a baseline image and selecting, as a given threshold level, the value corresponding to the least obtrusive technique that is close enough (e.g., within a threshold amount, such as pixel values varying by less than 5 percent) to a baseline image.

In response to determining to black out a portion of the display 104, the adjustment determination module 902 communicates a blackout adjustment indication 912 to the blackout control module 906, which determines the portion of the display 104 to black out and when that portion is to be blacked out. The blackout adjustment indication 912 includes an indication of the ambient light level measurement 910, allowing the blackout control module 906 to determine the appropriate manner in which to black out a portion of the display 104. In one or more embodiments, the blackout control module 906 blacks out the camera region 112 plus an expanded portion of the peripheral regions 114 in response to the ambient light level measurement 910 being less than a first threshold value (e.g., 1 lux), blacks out the camera region 112 (but not the expanded portion of the peripheral regions 114) in response to the ambient light level measurement 910 being at least the first threshold value (e.g., 1 lux) but less than a second threshold value (e.g., 50 lux), and strobes the display capturing images when the camera region 112 is black out in response to the ambient light level measurement 910 being between a third threshold value (e.g., 10,000 lux) and a fourth threshold value (e.g., 50,000 lux).

Additionally or alternatively, the blackout control module 904 may black out a portion of the display 104 in the same manner (e.g., the camera region 112 or the camera region 112 with the expanded portion) regardless of the ambient light level measurement 910. Additionally or alternatively, the manner in which to black out a portion of the display 104 can be a user selectable configuration setting.

Blacking out the camera region 112 (but not the expanded portion of the peripheral regions 114) refers to deactivating pixels in or otherwise displaying black in the camera region 112. Light will not be emitted from the camera region 112 while blacked out and thus the camera region 112 does not emit light that would interfere with the captured image. The blackout control module 906 is pre-programmed with or otherwise has knowledge of the location of the camera region 112 and provides a screen blackout indication 914 to the display module 106 to have the pixels in the camera region 112 deactivated pixels in or otherwise display black.

In one or more implementations, the display module 106 synchronizes with the camera module 108 so that the blacking out of the camera region 112 occurs concurrently with the capturing of an image by the digital camera 110. Accordingly, the camera region 112 is blacked out while the digital camera 110 is capturing an image but is not blacked out at other times. Additionally or alternatively, the display module 106 may determine the timing of when to black out the camera region 112 in other manners, such as when the imager of the digital camera 110 is active (e.g., powered on).

Figure 10:
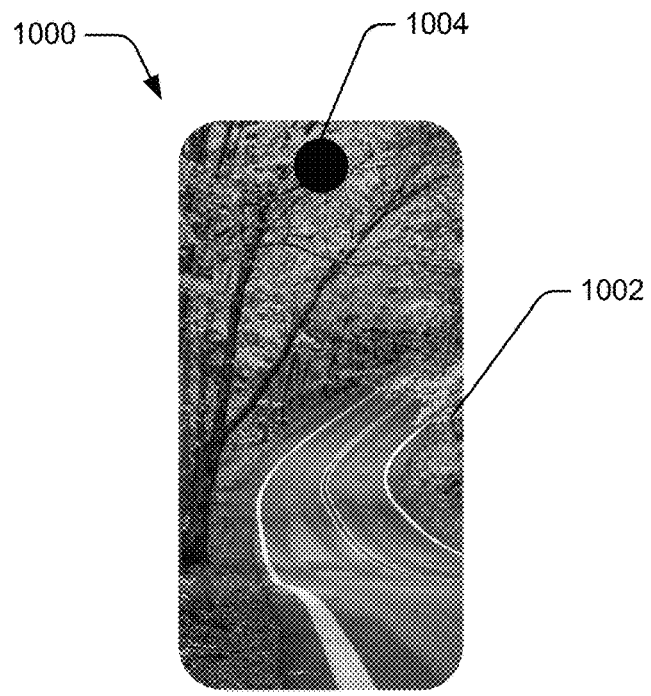
FIGS. 10 and 11 illustrate example client devices.

FIG. 10 illustrates an example client device 1000. The client device 1000 includes a display 1002 displaying an image (e.g., an autumn scene as illustrated). A camera region 1004 is illustrated blacked out so light that might interfere with a captured image will not be emitted from the camera region 1004. In one or more implementations, the camera region 1004 corresponds to the field of view of the camera 110 so the camera region 1004 includes only the portion of the display 1002 that is within the field of view of the camera 110.

Returning to FIG. 9, blacking out the camera region 112 plus an expanded portion of the peripheral regions 114 refers to deactivating pixels in or otherwise displaying black in an expanded region. This expanded region includes the camera region 112 as well as some of the peripheral region surrounding the camera region 112. Light will not be emitted from the expanded region while blacked out and thus the expanded region does not emit light that would interfere with the captured image.

The blackout control module 906 is pre-programmed with or otherwise has knowledge of the location of the camera region 112. The blackout control module 906 also determines an amount of the peripheral region surrounding the camera region 112 to also include in the expanded region. This amount can be identified in various manners, such as a percentage of the size of the camera region 112 (e.g., from the center of the camera region 112, determine the radius of the blackout region to be 10% or 20% larger than the radius of the camera region 112), a particular number of pixels (e.g., determine the radius of the blackout region to be 20 or 50 pixels larger than the radius of the camera region 112), and so forth. The blackout control module 906 provides the screen blackout indication 914 to the display module 106 to have the pixels in the expanded region deactivated or otherwise display black.

In one or more implementations, the display module 106 synchronizes with the camera module 108 so that the blacking out of the expanded region occurs concurrently with the capturing of an image by the digital camera 110. Accordingly, the expanded region is blacked out while the digital camera 110 is capturing an image but is not blacked out at other times. Additionally or alternatively, the display module 106 may determine the timing of when to black out the expanded region in other manners, such as when the imager of the digital camera 110 is active (e.g., powered on).

Figure 11:
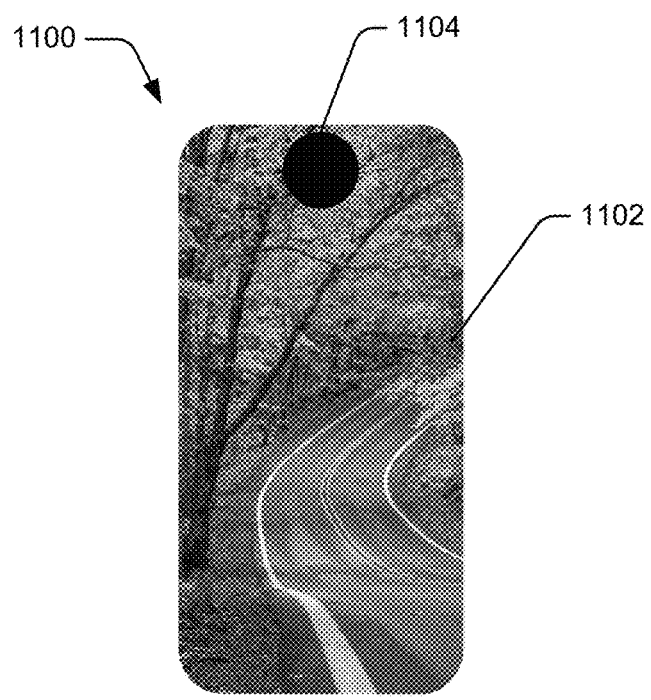

FIG. 11 illustrates another example client device 1100. The client device 1100 includes a display 1102 displaying an image (e.g., an autumn scene as illustrated). An expanded region 1104 is illustrated blacked out so light that might interfere with a captured image will not be emitted from the expanded region 1104. The expanded region 1104 corresponds to the field of view of the camera 110 as well as an additional portion of the peripheral region surrounding the field of view of the camera 110. As illustrated, the expanded region 1104 is larger than the camera region 1004 of FIG. 10. By using an expanded region 1104 rather than the smaller camera region 1004, no light is emitted from the peripheral region surrounding the field of view thereby preventing any stray light that might be reflected or scattered within the display 1102 from interfering with the captured image.

Returning to FIG. 9, strobing the display capturing images when the camera region 112 is black out refers to deactivating pixels in or otherwise displaying black in a region while the digital camera 110 is capturing an image but is not blacked out at other times. This region may be, for example, the camera region 112 or an expanded region that includes the camera region 112 as well as some of the peripheral region surrounding the camera region 112 as discussed above. Light will not be emitted from the region while blacked out and thus the region does not emit light that would interfere with the captured image. The blackout control module 906 is pre-programmed with or otherwise has knowledge of the location of the region to be blacked out. This region can be determined in various manners as discussed above regarding blacking out the camera region 112 or the expanded region. The blackout control module 906 provides the screen blackout indication 914 to the display module 106 to have the pixels in the expanded region deactivated or otherwise display black.

The display module 106 synchronizes with the camera module 108 so that the blacking out of the region occurs concurrently with the capturing of an image by the digital camera 110 but blacking out of the region does not occur when an image is not being captured by the digital camera 110. As an example, assume the imager of the digital camera 110 is capturing an image at a rate of 30 frames (images) per second with an integration time of 15 milliseconds, so the imager is capturing an image for 15 milliseconds (ms) every 33.33 ms. Accordingly, the region is blacked out for 15 ms then is powered on or displays an image for 18.33 ms until.

Figure 12:
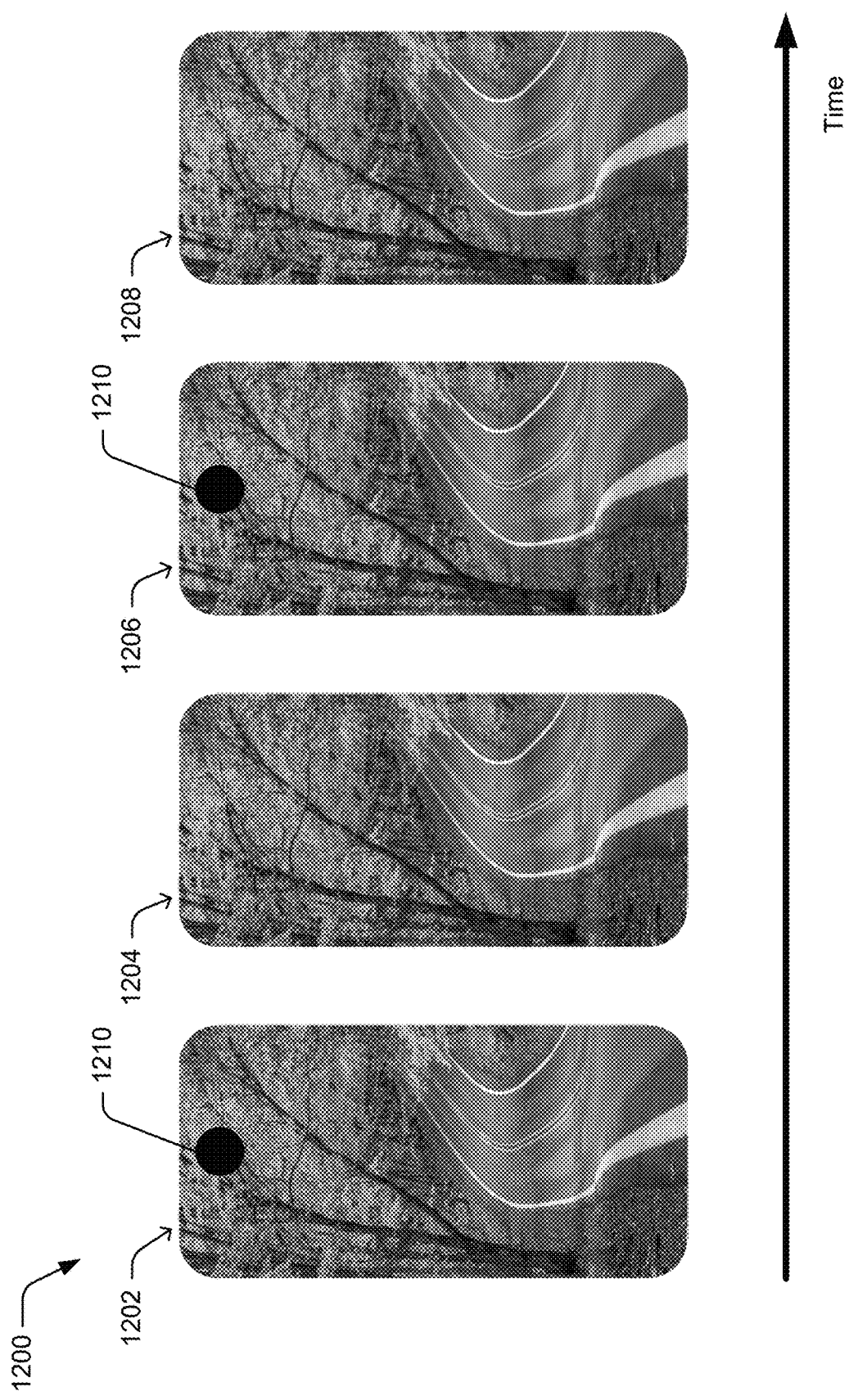
FIG. 12 illustrates an example of strobing a display.

FIG. 12 illustrates an example 1200 of strobing the display. A client device display of an image (e.g., an autumn scene as illustrated) is illustrated at times 1202, 1204, 1206, and 1208. At time 1202, the region 1210 is blacked out while an image is captured by the imager of the digital camera 110. As illustrated, the image is displayed in the peripheral region 114 of the display. At later time 1204, the region is powered on and displays a portion of the image. At a later time 1206, the region 1210 is blacked out while an image is captured by the imager of the digital camera 110. As illustrated, the image is displayed in the peripheral region 114 of the display. At later time 1208, the region is powered on and displays a portion of the image. By strobing the display the region is blacked out while an image is captured by the imager but at other times the region is powered on and displays a portion of an image. This reduces the amount of time that the region is blacked out, which reduces the visibility of the blacked out region to a user while at the same time mitigating interference from light emitted by the region during image capture.

In response to determining to reduce the brightness of the display 104, the adjustment determination module 902 communicates a brightness adjustment indication 916 to the brightness control module 904, which determines when and how to reduce the brightness of the display 104. In one or more embodiments, the brightness adjustment indication 916 includes an indication of the ambient light level measurement 910, allowing the brightness control module 904 to determine the appropriate manner in which to reduce the brightness of the display 104. Additionally or alternatively, the brightness control module 904 may reduce the brightness of the display 104 in the same manner regardless of the ambient light level measurement 910.

In one or more embodiments, the brightness control module 904 reduces the brightness of the display 104 in just the camera region (or an expanded region analogous to the expanded blackout region discussed above). Additionally or alternatively, the brightness control module 904 reduces the brightness of the display 104 across the entire display. Whether the brightness of the display 104 is reduced in just the camera region (or expanded region) or across the entire display can be determined by the brightness control module 904 in various manners, such as based on the ambient light level measurement 910 (e.g., reduce the brightness of the display 104 across the entire image if the ambient light level measurement 910 is below a threshold level, and reduce the brightness of the display over just the camera or expanded region if the ambient light level measurement 910 is at least the threshold level). By way of another example, whether to reduce the brightness across the entire display or just the camera region (or expanded region) can be a user selectable configuration setting, can be pre-configured in the brightness control module 940, and so forth.

The brightness control module 904 provides a brightness setting indication 918 to the display module 106 to reduce the brightness of the entire display 104 or a particular portion of the display 104. The amount to reduce the brightness can be specified in various manners, such as a fixed amount (e.g., on a brightness setting range of 0 to 100, reduce the brightness by 20), a variable amount (e.g., reduce the current brightness setting by 20%). The amount to reduce the brightness can also vary based on the ambient light level measurement, such as a larger reduction if the ambient light level measurement is below a threshold value than if the ambient light level measurement is above the threshold value. The brightness control module 904 is pre-programmed with or otherwise has knowledge of the location of the camera region 112 and can include in the brightness setting indication 918 an amount to reduce the brightness and a particular portion of the display 104 (e.g., the camera region 112 or an expanded region) or the entire display 104. The display module 106 reduces the brightness of a portion of the display by reducing the brightness of individual pixels within that portion.

In one or more implementations, the display module 106 synchronizes with the camera module 108 so that the brightness reduction occurs concurrently with the capturing of an image by the digital camera 110. Accordingly, the brightness of a portion of or the entire display 104 is reduced while the digital camera 110 is capturing an image but is not reduced at other times. Additionally or alternatively, the display module 106 may determine the timing of when to reduce the brightness of a portion of or the entire display 104 in other manners, such as when the imager of the digital camera 110 is active (e.g., powered on).

Figure 13:
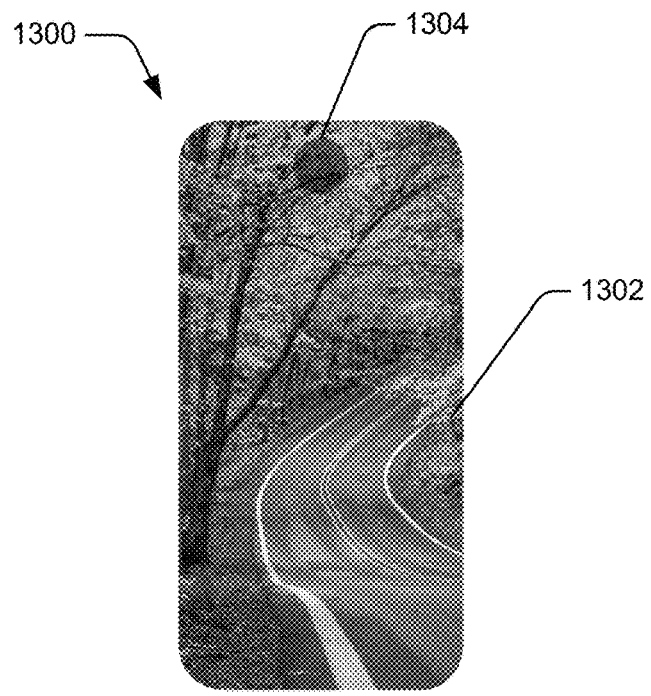
FIGS. 13, 14, and 15 illustrate example client devices.

FIG. 13 illustrates another example client device 1300. The client device 1300 includes a display 1302 displaying an image (e.g., an autumn scene as illustrated). A region 1304 is illustrated with reduced brightness so light from the region 1304 that might interfere with a captured image will be reduced. In one or more implementations, the region 1304 is the camera region 112, corresponding to the field of view of the camera 110. Additionally or alternatively, the region 1304 is an expanded region as discussed above with reference to blacking out a portion of display 104, although in FIG. 13 the portion 1304 has reduced brightness rather than being blacked out.

Figure 14:
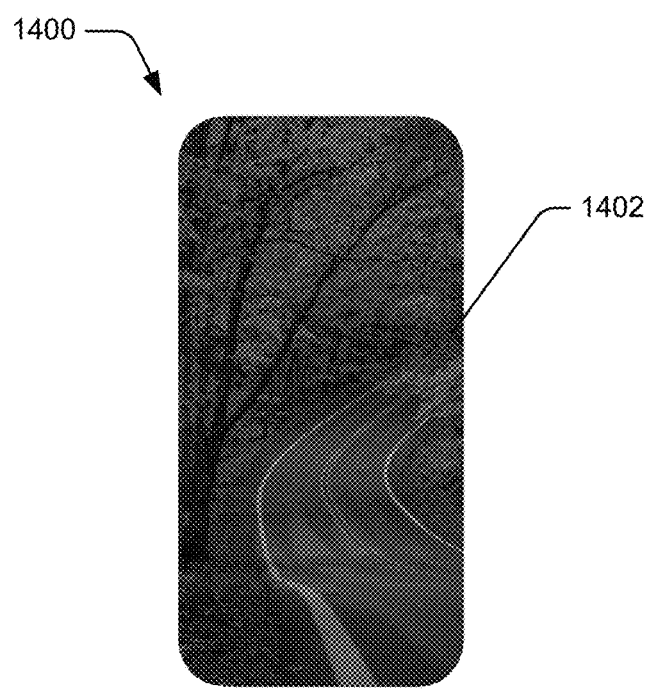

FIG. 14 illustrates another example client device 1400. The client device 1400 includes a display 1402 displaying an image (e.g., an autumn scene as illustrated). The display 1402 is illustrated with reduced brightness (e.g., relative to the peripheral regions 114 of display 1302 of FIG. 13) so light from the display 1402 that might interfere with a captured image will be reduced.

Returning to FIG. 9, in some situations different types or models of display 104 absorb some colors more than others, effectively reducing the amount of some colors that are emitted by the particular type or model of display 104 and captured by the digital camera 110. In such situations, the brightness control module 904 increases the brightness of or does not change colors that are absorbed more by the display 104, or decreases the brightness of colors that are not absorbed as well by the display 104. Accordingly, the brightness control module 904 may increase or decrease the brightness of some colors in the displayed image but not other colors.

Which colors are absorbed more than others can be determined in any of a variety of different manners. In one or more embodiments, the amount of various colors absorbed by a particular type or model of display 104 is determined empirically with a developer or designer testing the particular type or model of display 104. This testing can include, for example, shining light on the front of the display 104 and measuring at the back of the display 104 the amount of particular colors (e.g. primary colors, or red, green, and blue colors) that are passed through the display 104. By way of another example, this testing can include capturing calibration images (e.g., red, green, and blue calibration images) and measuring the brightnesses of the captured calibration image relative to one another to identify (based on known imager response information) which one or more colors are absorbed more than which other one or more colors. By way of another example, the transmittance curves of the individual color channels of the display 104 can be analyzed to identify which color channels absorb or transmit the most amount of energy, and thus can readily identify which colors are absorbed more by the display 104.

Figure 15:
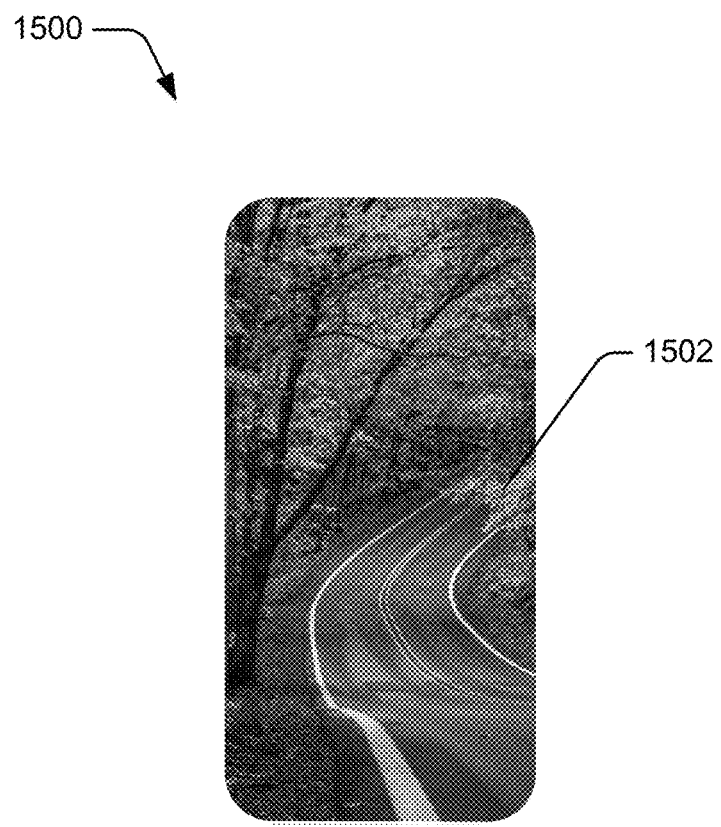

FIG. 15 illustrates another example client device 1500. The client device 1500 includes a display 1502 displaying an image (e.g., an autumn scene as illustrated). The example of FIG. 15 assumes that the display 1502 absorbs more blue than red or green, and absorbs less green than red or blue, so the display 1502 is illustrated with reduced brightness (e.g., relative to the display 402 of FIG. 4) of green and increased brightness of blue. Accordingly, the brightness of the light that is less absorbed by the display 1502 is decreased in the displayed image, but the brightness of the light that is more absorbed by the display 1502 is increased in the displayed image. This reduces the interference from the display 104 in captured images from colors that are less absorbed by the display 104, while helping maintain the brightness of the display 104 by not reducing the brightness of other colors.

Returning to FIG. 1, in one or more embodiments the displayed image on the display 104 while an image is being captured by the digital camera is a known image, such as an image that is frequently displayed on the display 104. For example, the displayed image may be an image for a lock screen of the client device that is displayed while the digital camera captures an image for authentication of the user. In such situations, the display interference mitigation system 116 can perform additional processing or analysis to determine how to mitigate interference from the display 104 while that particular displayed image is being displayed. This processing can include, for example, additional processing or analysis of colors in the displayed image to determine appropriate subtraction images, to determine appropriate brightness reductions, and so forth.

Various different techniques for mitigating interference from a display with a captured image are discussed herein. It is to be appreciated that the display interference mitigation system 116 can use any one or combination of these different techniques to mitigate interference from a display with a captured image. For example, any of the techniques for reducing the brightness of the display can be performed while an image is captured, and calibration images can be subtracted from the captured image to generate an enhanced output image. By way of another example, the brightness of particular colors of the display can be reduced concurrent with blacking out the camera region or expanded region of the display.

In one or more embodiments the display interference mitigation system 116 blacks out or otherwise reduces the brightness of a camera region or expanded region as discussed above. In such situations, the display interference mitigation system 116 optionally blacks out or otherwise reduces the brightness of a camera region or expanded region while calibration images or recalibration images are being captured. The display module 106 may reduce the brightness of the calibration images or recalibration images, or the calibration images or recalibration images may be generated with the reduced brightness (e.g., displaying black in the camera region or expanded region). This prevents the display interference mitigation system 116 from using captured calibration images or captured recalibration images that emit light in a region of the display at a brightness that will not be used while subsequently capturing images.

It should be noted that this may result in multiple sets of captured calibration images or captured recalibration images with each set corresponding to a particular blacking out or reduction in brightness of a camera region or expanded region, and the appropriate one of the multiple sets being used to generate the enhanced output image based on the region and how the brightness of the region is reduced when capturing a subsequent image.

Figure 16:
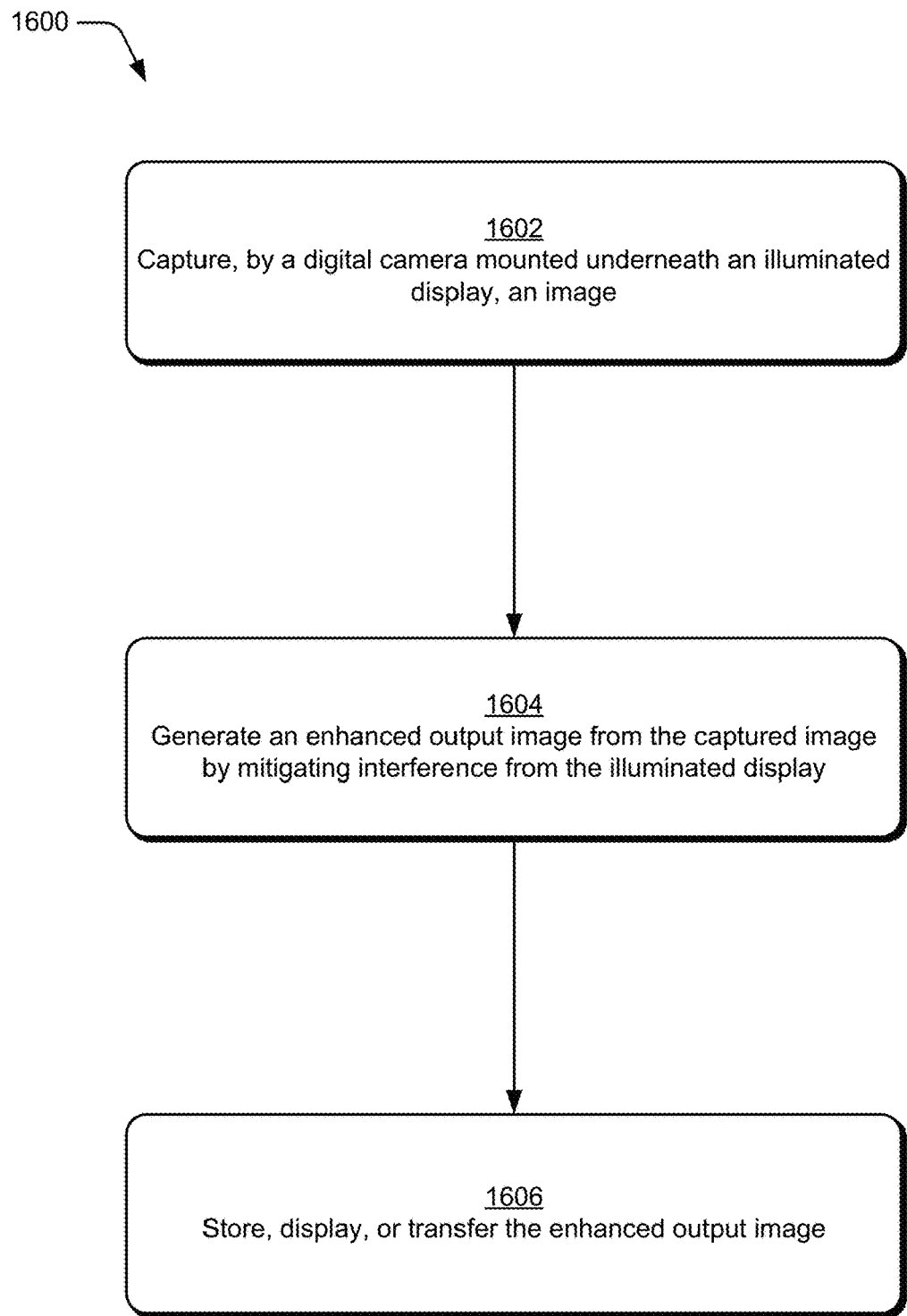
FIGS. 16, 17, 18, and 19 illustrate example processes for implementing the techniques discussed herein in accordance with one or more embodiments.

FIG. 16 illustrates an example process 1600 for implementing the techniques discussed herein in accordance with one or more embodiments. Process 1600 is carried out by a display interference mitigation system, such as display interference mitigation system 116 of FIG. 1, and can be implemented in software, firmware, hardware, or combinations thereof. Process 1600 is shown as a set of acts and is not limited to the order shown for performing the operations of the various acts.

In process 1600, an image is captured by a digital camera mounted underneath an illuminated display (act 1602). The field of view of the digital camera passes through the illuminated display, and the digital camera can capture the image while another image is being displayed on the illuminated display.

An enhanced output image is generated from the captured image by mitigating interference from the illuminated display (act 1604). As discussed herein, light emitted from the illuminated display can be captured along with the captured image but is mitigated to generate the enhanced output image.

The enhanced output image is stored, displayed, or transferred (act 1606). The enhanced output image can be stored locally, displayed on the illuminated display, communicated or transferred to another device or system, and so forth.

Figure 17:
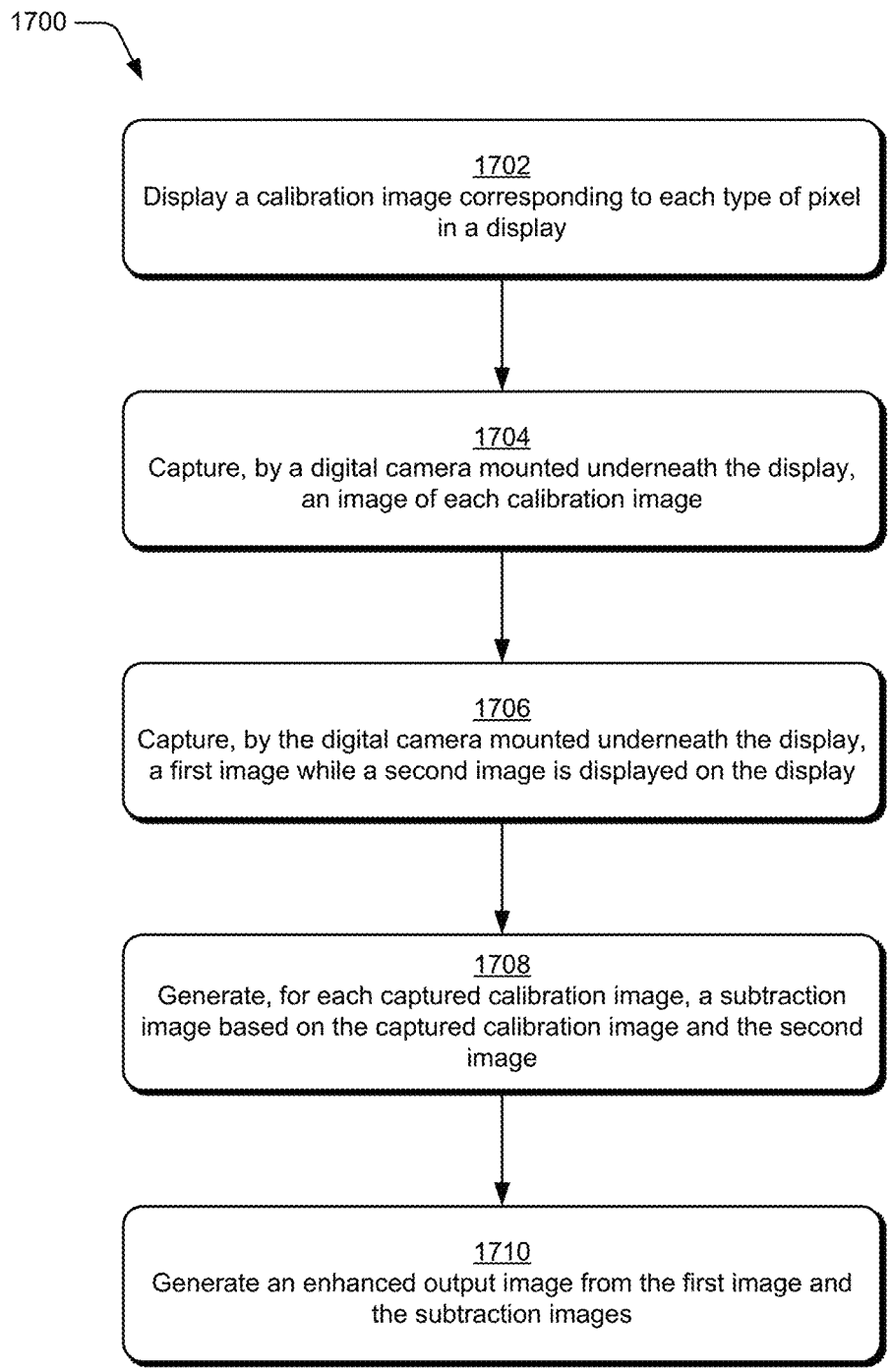

FIG. 17 illustrates another example process 1700 for implementing the techniques discussed herein in accordance with one or more embodiments. Process 1700 is carried out by a display interference mitigation system, such as display interference mitigation system 116 of FIG. 1, and can be implemented in software, firmware, hardware, or combinations thereof. Process 1700 is shown as a set of acts and is not limited to the order shown for performing the operations of the various acts.

In process 1700, a calibration image corresponding to each type of pixel in a display is displayed (at 1702). For example, for display including red, green, and blue pixels, a red calibration image is displayed, a green calibration image is displayed, and a blue calibration image is displayed. These calibration images are displayed separately (e.g., the display displaying all red, followed by all green at a later time, followed by all blue at a later time).

Each displayed calibration image is captured by a digital camera mounted underneath the display (act 1704). The field of view of the digital camera passes through the display, and the digital camera captures images of the displayed calibration images.

The digital camera mounted underneath the display captures a first image while a second image is displayed on the display (act 1706). The second image is displayed and the first image is captured at a time after the calibration images have been displayed and captured in acts 1702 and 1704.

For each captured calibration image, a subtraction image is generated based on the captured and the second image (act 1708). These subtraction images correspond to interference from the display resulting from displaying the second image while the first image is captured.

An enhanced output image is generated from the first image and the subtraction images (act 1710). By subtracting the subtraction images from the first image, interference from the illuminated display displaying the second image while the first image is captured is mitigated.

Figure 18:
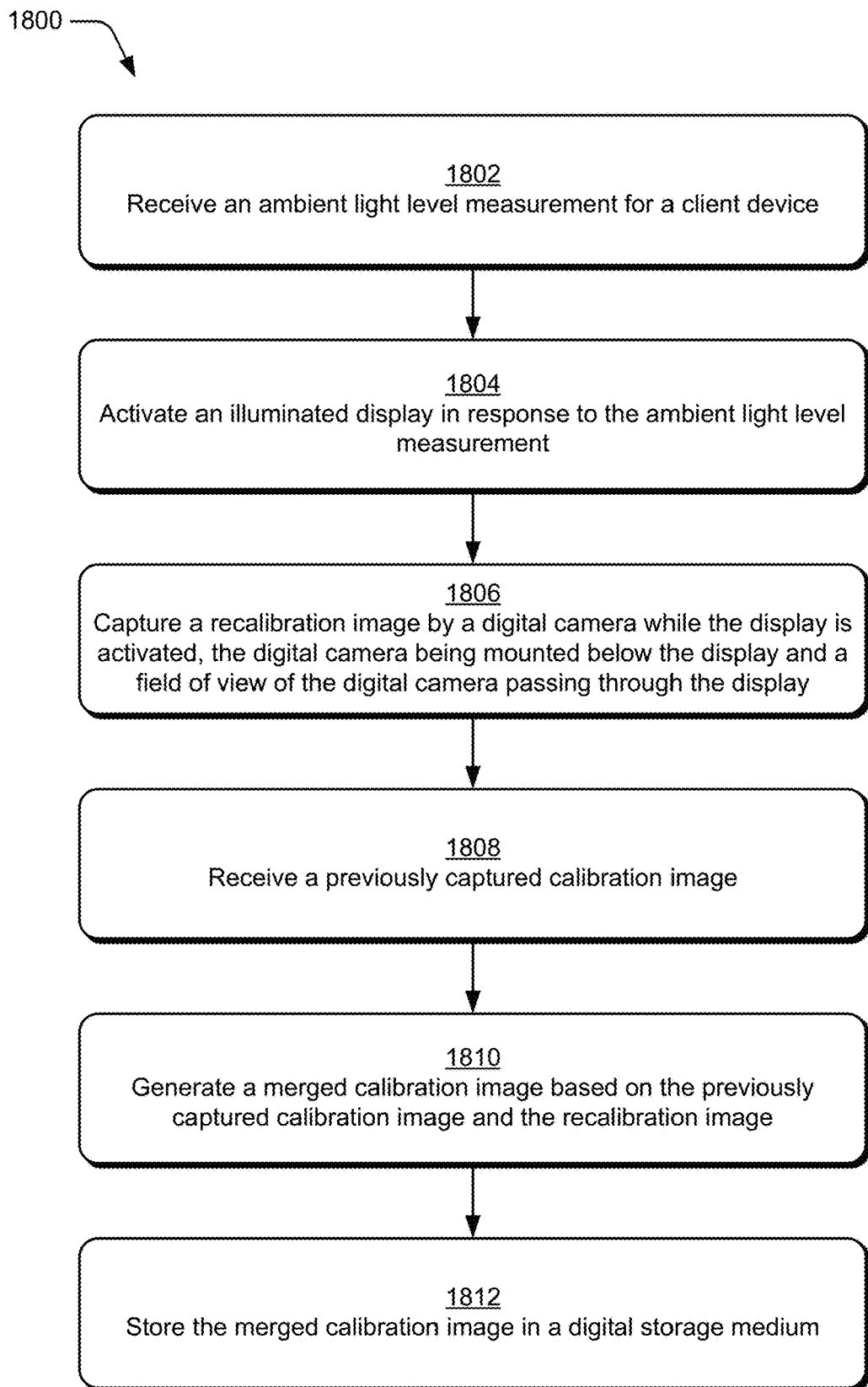

FIG. 18 illustrates another example process 1800 for implementing the techniques discussed herein in accordance with one or more embodiments. Process 1800 is carried out by a display interference mitigation system including a recalibration module, such as display interference mitigation system 116 of FIG. 1 including a recalibration module 800 of FIG. 8, and can be implemented in software, firmware, hardware, or combinations thereof. Process 1800 is shown as a set of acts and is not limited to the order shown for performing the operations of the various acts.

In process 1800, an ambient light level measurement for a client device is received (act 1802). The ambient light level measurement is received from any of various sensors, such as an ambient light sensor of the client device, an imager of a digital camera of the client device, and so forth.

A display of the client device is activated in response to the ambient light level measurement (act 1804). The display is an illuminated display, such as an OLED display. The display is activated in response to the ambient light level measurement indicating the client device is in a low light environment (e.g., less than a threshold light level). If the display is already activated, then the display need not be re-activated in act 1804.

A recalibration image is captured by a digital camera of the client device while the display is activated (act 1806). The digital camera is situated behind the display and the field of view of the digital camera passes through the display. The digital camera captures a recalibration image being displayed on the display, resulting in the captured calibration image.

A previously captured calibration image is received (act 1808). This previously captured calibration image is, for example, a calibration image previously captured and stored in a digital storage medium of the client device.

A merged calibration image is generated based on the previously captured calibration image and the recalibration image (act 1810). The merged calibration image can be generated in various manners, such as by replacing one or more portions of the calibration image with the corresponding one or more portions of the recalibration image, blending (e.g., averaging or otherwise combining) corresponding pixel values from one or more portions of the calibration image and one or more portions of the recalibration image, and so forth.

The merged calibration image is stored in a digital storage medium (act 1812). In one or more implementations, the merged calibration image replaces the previously captured calibration image received in act 1808.

Acts 1806-1812 can be repeated for each of multiple different pixel types in the display. For example, if the display includes red, green, and blue pixels, then acts 1806-1812 are repeated for each of a red recalibration image, a green recalibration image, and a blue recalibration image, resulting in a red merged calibration image, a green merged calibration image, and a blue merged calibration image, respectively.

Figure 19:
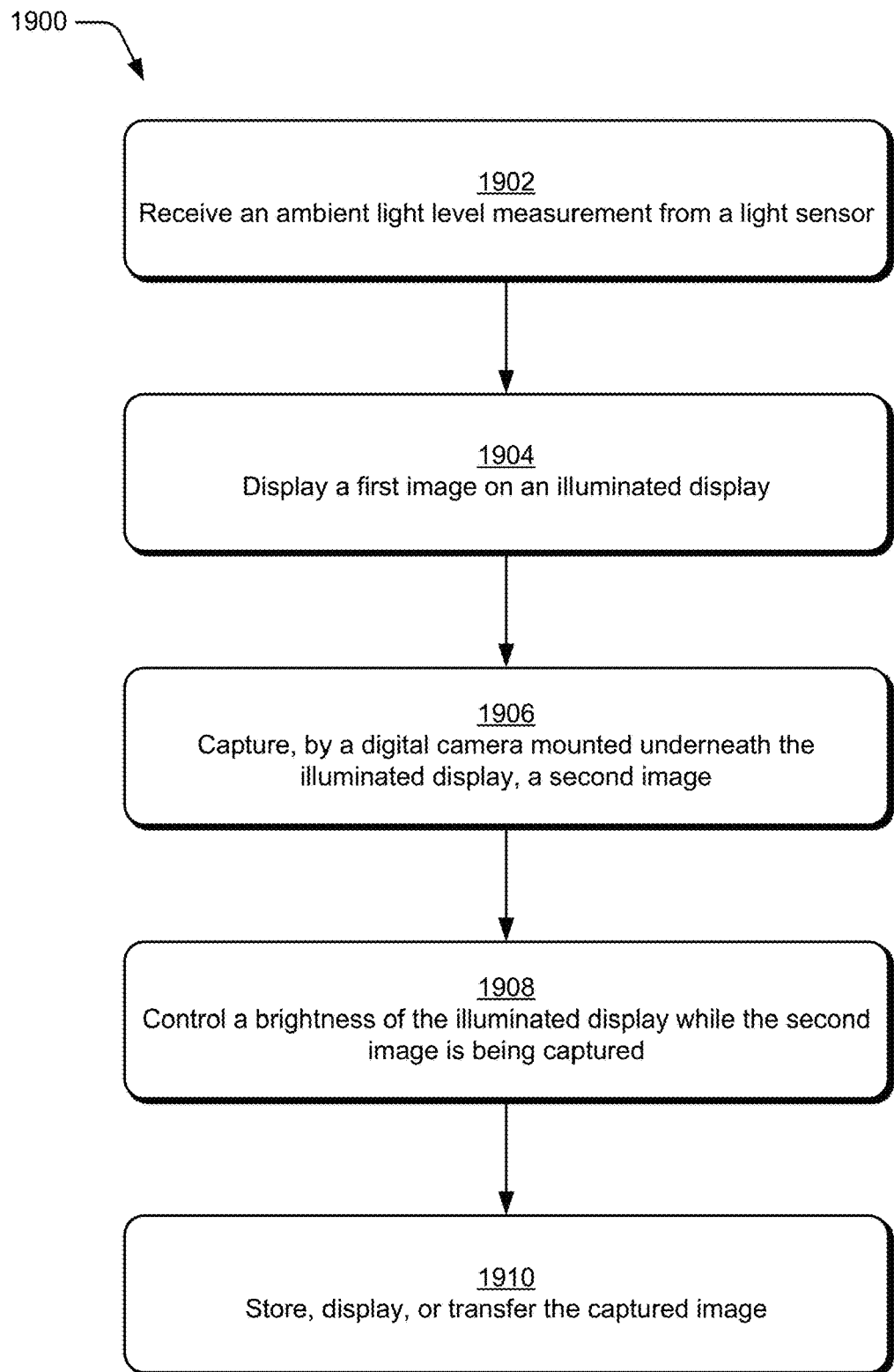

FIG. 19 illustrates another example process 1900 for implementing the techniques discussed herein in accordance with one or more embodiments. Process 1900 is carried out by a display interference mitigation system including a brightness adjustment module, such as display interference mitigation system 116 of FIG. 1 including a brightness adjustment module 900 of FIG. 9, and can be implemented in software, firmware, hardware, or combinations thereof. Process 1900 is shown as a set of acts and is not limited to the order shown for performing the operations of the various acts.

In process 1900, an ambient light level measurement for a client device is received (act 1902). The ambient light level measurement is received from any of various sensors, such as an ambient light sensor of the client device, an imager of a digital camera of the client device, and so forth.

A first image is displayed on an illuminated display of the client device (act 1904). The first image can be generated by any of a variety of different applications, programs, or other modules or components of the client device.

A second image is captured by a digital camera mounted underneath the illuminated display (act 1906). The digital camera has a field of view that passes through the illuminated display.

A brightness of the illuminated display is controlled while the second image is being captured (act 1908). The brightness can be controlled based on the ambient light level measurement. This control of the brightness can include blacking out a portion of the illuminated display, reducing the brightness of one or more colors of the illuminated display, and so forth as discussed above to mitigate interference associated with the illuminated display.

The image captured in act 1906 is stored in a digital storage medium, displayed, or transferred (act 1908). The captured image can optionally be transferred to any of a variety of other devices, systems, or modules.

Although particular functionality is discussed herein with reference to particular modules, it should be noted that the functionality of individual modules discussed herein can be separated into multiple modules or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action or another module invoked or otherwise accessed by that particular module performing the action.

Figure 20:
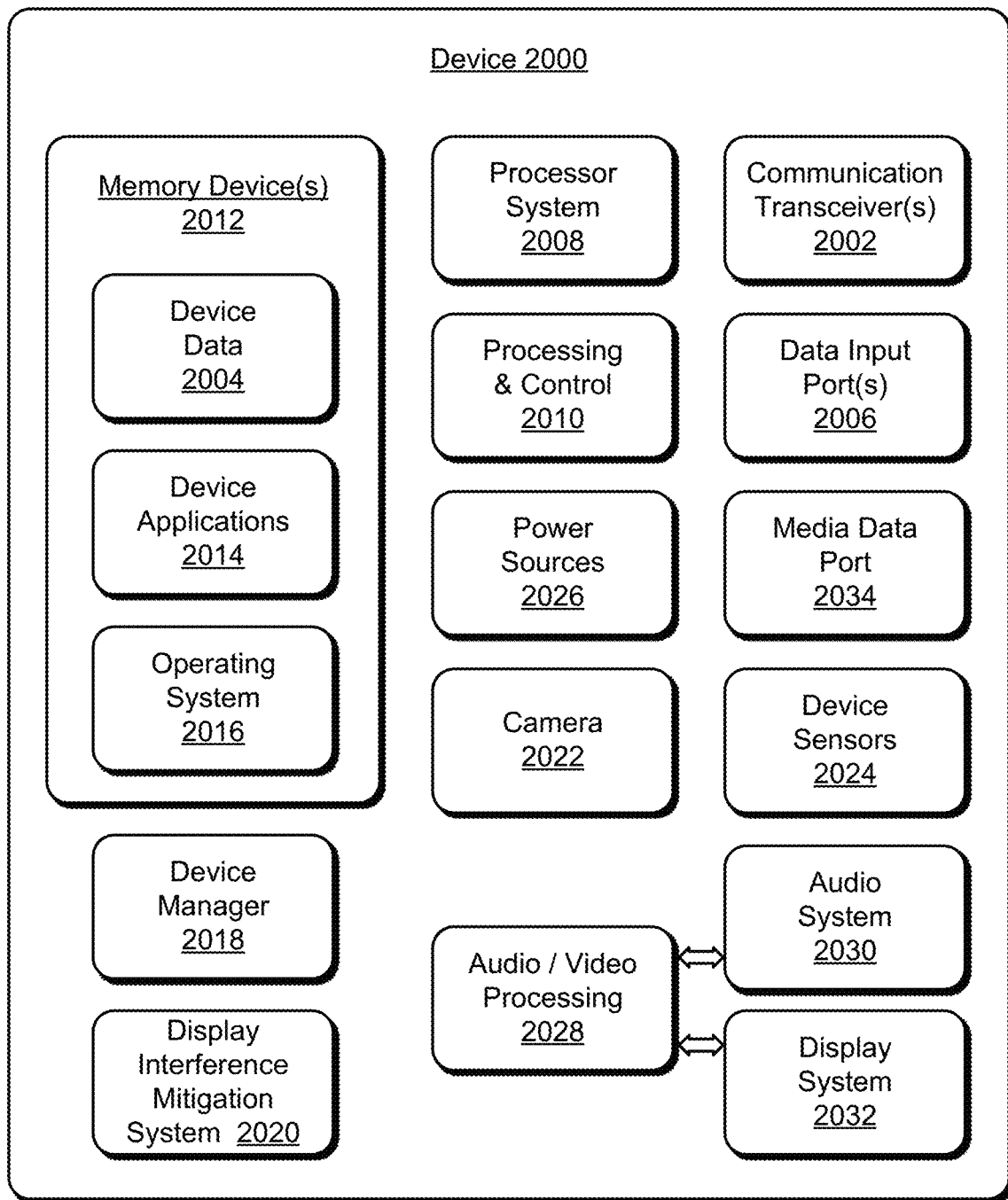
FIG. 20 illustrates various components of an example device that can be used to implement the techniques described herein.

FIG. 20 illustrates various components of an example device 2000, in which aspects of the techniques described herein can be implemented. The example device 2000 can be implemented as any of the devices described with reference to the previous FIGS. 1-19, such as any type of a wireless device, mobile phone, client device, companion device, paired device, display device, tablet, computing, communication, entertainment, gaming, media playback, and/or any other type of computing and/or electronic device. For example, the client device 102 described above may be implemented as the example device 2000.

The device 2000 includes communication transceivers 2002 that enable wired and/or wireless communication of device data 2004 with other devices. The device data 2004 can include any type of audio, video, and/or image data. Example communication transceivers 2002 include wireless personal area network (WPAN) radios compliant with various IEEE 1002.15 (Bluetooth™) standards, wireless local area network (WLAN) radios compliant with any of the various IEEE 1002.11 (WiFi™) standards, wireless wide area network (WWAN) radios for cellular phone communication, wireless metropolitan area network (WMAN) radios compliant with various IEEE 1002.16 (WiMAX™) standards, and wired local area network (LAN) Ethernet transceivers for network data communication.

The device 2000 may also include one or more data input ports 2006 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 2000 includes a processor system 2008 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 2010. The device 2000 may further include any type of a system bus or other data and command transfer system that couples the various components within the device. A system bus can include any one or combination of different bus structures and architectures, as well as control and data lines.

The device 2000 also includes computer-readable storage memory 2012 (e.g., memory devices) that enable data storage, such as data storage devices that can be accessed by a computing device, and that provide persistent storage of data and executable instructions (e.g., software applications, programs, functions, and the like). Examples of the computer-readable storage memory 2012 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 2000 may also include a mass storage media device.

The computer-readable storage memory 2012 provides data storage mechanisms to store the device data 2004, other types of information and/or data, and various device applications 2014 (e.g., software applications). For example, an operating system 2016 can be maintained as software instructions with a memory device and executed by the processor system 2008. The device applications may also include a device manager 2018, such as any form of a control application, software application, signal-processing and control module, code that is native to a particular device, a hardware abstraction layer for a particular device, and so on.

In this example, the device 2000 includes a display interference mitigation system 2020 further to implementations of mitigating display interference with captured image by controlling display brightness. Examples of the display interference mitigation system 2020 include the display interference mitigation system 116 described with reference to FIG. 1 and the display interference mitigation system 300 described above with reference to FIG. 3, and may be implemented to perform aspects of the various techniques described herein.

In this example, the device 2000 also includes a camera 2022 and device sensors 2024, such as a temperature sensor to monitor device component operating temperatures, a temperature sensor to monitor temperatures external to the device 2000, and device sensors such as may be implemented as components of an inertial measurement unit (IMU). Sensors 2024 can include various additional sensors, such as a proximity sensor, an ambient light sensor, an accelerometer, a gyroscope, and so forth. The device 2000 can also include one or more power sources 2026, such as when the device is implemented as a wireless device or collaborative device. The power sources may include a charging and/or power system, and can be implemented as a flexible strip battery, a rechargeable battery, a charged super-capacitor, and/or any other type of active or passive power source.

The device 2000 can also include an audio and/or video processing system 2028 that generates audio data for an audio system 2030 and/or generates display data for a display system 2032. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 2034. In implementations, the audio system and/or the display system are integrated components of the example device. Alternatively, the audio system and/or the display system are external, peripheral components to the example device.

Although embodiments of techniques for mitigating display interference with captured image by controlling display brightness have been described in language specific to features or methods, the subject of the appended claims is not necessarily limited to the specific features or methods described. Rather, the specific features and methods are disclosed as example implementations of techniques for implementing mitigating display interference with captured image by controlling display brightness. Further, various different embodiments are described, and it is to be appreciated that each described embodiment can be implemented independently or in connection with one or more other described embodiments. Additional aspects of the techniques, features, and/or methods discussed herein relate to one or more of the following:

A client device comprising: an illuminated display; a digital camera mounted underneath the illuminated display, wherein a field of view of the digital camera passes through the illuminated display; an ambient light level sensor; a processor system coupled to the digital camera and the ambient light sensor, wherein an input image captured by the digital camera is processed to mitigate interference associated with the illuminated display, and to produce an enhanced output image, further comprising use of an ambient light level measurement from the ambient light level sensor to control the brightness of the illuminated display; and a digital storage medium used to store the enhanced output image.

Alternatively or in addition to the above described client device, any one or combination of the following. Wherein the ambient light sensor comprises an imager of the digital camera. Wherein to control the brightness of the illuminated display is to reduce the brightness of the illuminated display in the field of view of the digital camera and not reduce the brightness of other portions of the illuminated display. Wherein to control the brightness of the illuminated display is to reduce the brightness of the entire illuminated display. Wherein to control the brightness of the illuminated display is to reduce the brightness of one color of the illuminated display but not reduce the brightness of another color of the illuminated display. Wherein to control the brightness of the illuminated display is to black out the illuminated display in the field of view of the digital camera and not black out other portions of the illuminated display. Wherein to control the brightness of the illuminated display is to strobe the illuminated display by blacking out the illuminated display in the field of view of the digital camera while an imager of the digital camera is active and capturing an image but not blacking out the illuminated display in the field of view of the digital camera while the imager is active and not capturing an image. Wherein to control the brightness of the illuminated display is to determine an expanded region of the illuminated display that includes a portion of the illuminated display in the field of view of the digital camera and a portion of the illuminated display beyond the field of view of the digital camera but less than all of the illuminated display, and to black out the illuminated display in the expanded region and not black out other portions of the illuminated display. Wherein to black out the illuminated display in the expanded region is to black out the illuminated display in the expanded region while an imager of the digital camera is active and capturing an image but not black out the illuminated display in the expanded region while the imager is active and not capturing an image.

A method comprising: receiving an ambient light level measurement from a light sensor; displaying a first image on an illuminated display; capturing, by a digital camera, a second image, wherein the digital camera is mounted underneath the illuminated display and a field of view of the digital camera passes through the illuminated display; controlling, based on the ambient light level measurement, a brightness of the illuminated display while the first image is being displayed and the second image is being captured to mitigate interference associated with the illuminated display; and storing the first image in a digital storage medium.

Alternatively or in addition to the above described method, any one or combination of the following. Wherein controlling the brightness of the illuminated display includes reducing the brightness of the illuminated display in the field of view of the digital camera and not reducing the brightness of other portions of the illuminated display. Wherein controlling the brightness of the illuminated display includes reducing the brightness of the entire illuminated display. Wherein controlling the brightness of the illuminated display includes reducing the brightness of one color of the illuminated display but not reducing the brightness of another color of the illuminated display. Wherein controlling the brightness of the illuminated display includes blacking out the illuminated display in the field of view of the digital camera and not blacking out other portions of the illuminated display. Wherein controlling the brightness of the illuminated display includes: determining an expanded region of the illuminated display that includes a portion of the illuminated display in the field of view of the digital camera and a portion of the illuminated display beyond the field of view of the digital camera but less than all of the illuminated display; and blacking out the illuminated display in the expanded region and not black out other portions of the illuminated display. The method further comprising generating a set of subtraction images based on a set of calibration images captured by the digital camera; and producing an enhanced output image from the second image by the set of subtraction images from the second image.

A client device comprising: a processor implemented in hardware; an illuminated display; an ambient light sensor; a digital camera positioned underneath the illuminated display, wherein a field of view of the digital camera passes through the illuminated display; and a computer-readable storage medium having stored thereon multiple instructions that, responsive to execution by the processor, cause the processor to perform acts including: receiving an ambient light level measurement from the ambient light sensor; capturing, by the digital camera, a first image; controlling, based on the ambient light level measurement, a brightness of the illuminated display while the first image is being captured to mitigate interference associated with the illuminated display; and storing the first image in a digital storage medium.

Alternatively or in addition to the above described client device, any one or combination of the following. Wherein controlling the brightness of the illuminated display includes blacking out the illuminated display in the field of view of the digital camera and not blacking out other portions of the illuminated display. Wherein blacking out the illuminated display in the field of view of the digital camera includes blacking out the illuminated display in the field of view of the digital camera while an imager of the digital camera is active and capturing the first image but not blacking out the illuminated display in the field of view of the digital camera while the imager is active and not capturing the first image. Wherein controlling the brightness of the illuminated display includes determining an expanded region of the illuminated display that includes a portion of the illuminated display in the field of view of the digital camera and a portion of the illuminated display beyond the field of view of the digital camera but less than all of the illuminated display, and blacking out the illuminated display in the expanded region and not blacking out other portions of the illuminated display. wherein blacking out the illuminated display in the expanded region includes blacking out the illuminated display in the expanded region while an imager of the digital camera is active and capturing the first image but not blacking out the illuminated display in the expanded region while the imager is active and not capturing the first image.

The invention claimed is:

1. A client device comprising:
an illuminated display;
a digital camera mounted underneath the illuminated display, wherein a field of view of the digital camera passes through the illuminated display;
an ambient light level sensor;
a processor system coupled to the digital camera and the ambient light level sensor, wherein an input image captured by the digital camera is processed to mitigate interference associated with the illuminated display, and to produce an enhanced output image, further comprising use of an ambient light level measurement from the ambient light level sensor to reduce a brightness of one color of the illuminated display but not reduce the brightness of another color of the illuminated display; and
a digital storage medium used to store the enhanced output image.

2. The client device of claim 1, wherein the ambient light level sensor comprises an imager of the digital camera.

3. The client device of claim 1, wherein to reduce the brightness of the illuminated display is to reduce the brightness of the illuminated display in the field of view of the digital camera and not reduce the brightness of other portions of the illuminated display.

4. The client device of claim 1, wherein to reduce the brightness of the illuminated display is to reduce the brightness of the entire illuminated display.

5. The client device of claim 1, wherein to reduce the brightness of the illuminated display is to reduce the brightness of the illuminated display in the field of view of the digital camera while an imager of the digital camera is active and capturing an image but not reducing the brightness of the illuminated display in the field of view of the digital camera while the imager is active and not capturing an image.

6. The client device of claim 1, wherein to reduce the brightness of the illuminated display is to determine an expanded region of the illuminated display that includes a portion of the illuminated display in the field of view of the digital camera and an additional portion of the illuminated display beyond the field of view of the digital camera but less than all of the illuminated display, and to reduce the brightness of the illuminated display in the expanded region and not reduce the brightness of other portions of the illuminated display.

7. The client device of claim 6, wherein to reduce the brightness of the illuminated display in the expanded region is to reduce the brightness of the illuminated display in the expanded region while an imager of the digital camera is active and capturing an image but not reduce the brightness of the illuminated display in the expanded region while the imager is active and not capturing an image.

8. A method comprising:
receiving an ambient light level measurement from a light sensor;
displaying a first image on an illuminated display;
capturing, by a digital camera, a second image, wherein the digital camera is mounted underneath the illuminated display and a field of view of the digital camera passes through the illuminated display;
reducing, based on the ambient light level measurement, a brightness of one color of the illuminated display but not reducing the brightness of another color of the illuminated display while the first image is being displayed and the second image is being captured to mitigate interference associated with the illuminated display; and storing the second image in a digital storage medium.

9. The method of claim 8, wherein reducing the brightness of the illuminated display includes reducing the brightness of the illuminated display in the field of view of the digital camera and not reducing the brightness of other portions of the illuminated display.

10. The method of claim 8, wherein reducing the brightness of the illuminated display includes:
determining an expanded region of the illuminated display that includes a portion of the illuminated display in the field of view of the digital camera and a portion of the illuminated display beyond the field of view of the digital camera but less than all of the illuminated display; and
reducing the brightness of the illuminated display in the expanded region and not reducing the brightness of other portions of the illuminated display.

11. The method of claim 8, further comprising:
generating a set of subtraction images based on a set of calibration images captured by the digital camera; and
producing an enhanced output image from the second image by the set of subtraction images from the second image.

12. The method of claim 8, further comprising:
determining which color of multiple colors is absorbed more by the illuminated display than other colors of the multiple colors; and
increasing the brightness of the determined color of the illuminated display but not increasing the brightness of the other colors of the illuminated display while the first image is being displayed and the second image is being captured.

13. The method of claim 8, further comprising:
determining which color of multiple colors is absorbed less by the illuminated display than other colors of the multiple colors; and
reducing the brightness of the determined color of the illuminated display but not reducing the brightness of the other colors of the illuminated display while the first image is being displayed and the second image is being captured.

14. A client device comprising:
a processor implemented in hardware;
an illuminated display;
an ambient light sensor;
a digital camera positioned underneath the illuminated display, wherein a field of view of the digital camera passes through the illuminated display; and
a computer-readable storage medium having stored thereon multiple instructions that, responsive to execution by the processor, cause the processor to perform acts including:
receiving an ambient light level measurement from the ambient light sensor;
capturing, by the digital camera, a first image;
reducing, based on the ambient light level measurement, a brightness of one color of the illuminated display but not reducing the brightness of another color of the illuminated display while the first image is being captured to mitigate interference associated with the illuminated display; and
storing the first image in a digital storage medium.

15. The client device of claim 14, wherein reducing the brightness of the illuminated display includes reducing the brightness of the illuminated display in the field of view of the digital camera and not reducing the brightness of the illuminated display in other portions of the illuminated display.

16. The client device of claim 15, wherein reducing the brightness of the illuminated display in the field of view of the digital camera includes reducing the brightness of the illuminated display in the field of view of the digital camera while an imager of the digital camera is active and capturing the first image but not reducing the brightness of the illuminated display in the field of view of the digital camera while the imager is active and not capturing the first image.

17. The client device of claim 14, wherein reducing the brightness of the illuminated display includes determining an expanded region of the illuminated display that includes a portion of the illuminated display in the field of view of the digital camera and an additional portion of the illuminated display beyond the field of view of the digital camera but less than all of the illuminated display, and reducing the brightness of the illuminated display in the expanded region and not reducing the brightness of other portions of the illuminated display.

18. The client device of claim 17, wherein reducing the brightness of the illuminated display in the expanded region includes reducing the brightness of the illuminated display in the expanded region while an imager of the digital camera is active and capturing the first image but not reducing the brightness of the illuminated display in the expanded region while the imager is active and not capturing the first image.

19. The client device of claim 16, the acts further including:
determining whether the ambient light level measurement exceeds a threshold;
reducing the brightness of the illuminated display by a first amount based on the ambient light level measurement not exceeding the threshold; and
reducing the brightness of the illuminated display by a second amount based on the ambient light level measurement exceeding the threshold, the first amount being larger than the second amount.

20. The client device of claim 14, wherein reducing the brightness of the illuminated display includes reducing the brightness of the entire illuminated display.

\* \* \* \* \*